United States Patent
Takamine et al.

(10) Patent No.: US 7,193,688 B2
(45) Date of Patent: Mar. 20, 2007

(54) IMAGE FORMING DEVICE CAPABLE OF REPRODUCING SOUND, AND CONTENT REPRODUCING METHOD

(75) Inventors: Kouichi Takamine, Kawanishi (JP); Atsushi Hirose, Sanda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 797 days.

(21) Appl. No.: 10/305,005

(22) Filed: Nov. 27, 2002

(65) Prior Publication Data

US 2003/0107750 A1    Jun. 12, 2003

(30) Foreign Application Priority Data

Dec. 12, 2001    (JP)    ............................. 2001-379334

(51) Int. Cl.
  *G03B 27/08*    (2006.01)
(52) U.S. Cl. ........................ 355/98; 355/31; 382/311; 358/409; 358/441
(58) Field of Classification Search ................. 355/31; 235/462.11, 470; 382/100; 358/1.1, 443
  See application file for complete search history.

(56) References Cited

U.S. PATENT DOCUMENTS

| | | | | |
|---|---|---|---|---|
| 6,384,921 B1 * | 5/2002 | Saijo et al. | ................... | 358/1.1 |
| 6,999,637 B1 * | 2/2006 | Anderson et al. | ........... | 382/311 |
| 2002/0075464 A1 * | 6/2002 | Adams et al. | ................ | 355/31 |
| 2002/0158129 A1 * | 10/2002 | Hu | ........................ | 235/462.11 |

FOREIGN PATENT DOCUMENTS

| | | | |
|---|---|---|---|
| JP | 08-185533 | | 7/1996 |
| JP | 2000-224524 | * | 1/1999 |
| JP | 2000-244682 | * | 2/1999 |
| JP | 2000-224524 | | 8/2000 |
| JP | 2000-244682 | | 9/2000 |
| JP | 2000-343762 | | 12/2000 |
| JP | 2002-273952 | | 9/2002 |
| JP | 2002-331712 | | 11/2002 |

* cited by examiner

*Primary Examiner*—Twyler Lamb
*Assistant Examiner*—Robert N. Kang
(74) *Attorney, Agent, or Firm*—Wenderoth, Lind & Ponack, L.L.P.

(57) ABSTRACT

An image forming device includes a printer engine, a display unit, and a sound reproducing unit. The image forming device receives a list of contents from a content distributing device, and has the display unit display the content list. From the content list displayed by the display unit, a user of the image forming device selects a print content, a display content, and a sound content that he desires, associates the selected contents with one another to produce a group of the selected contents, and requests the content distributing device to distribute the group of the selected contents. The content distributing device produces the group of contents associated with one another, and distributes the group of contents to the image forming device. The image forming device expands the print content in the distributed content group into print data, and has the printer engine print the print data. In synchronization with printing of the print data, the display unit displays the display content associated with the print content, and the sound reproducing unit reproduces the sound content.

6 Claims, 18 Drawing Sheets

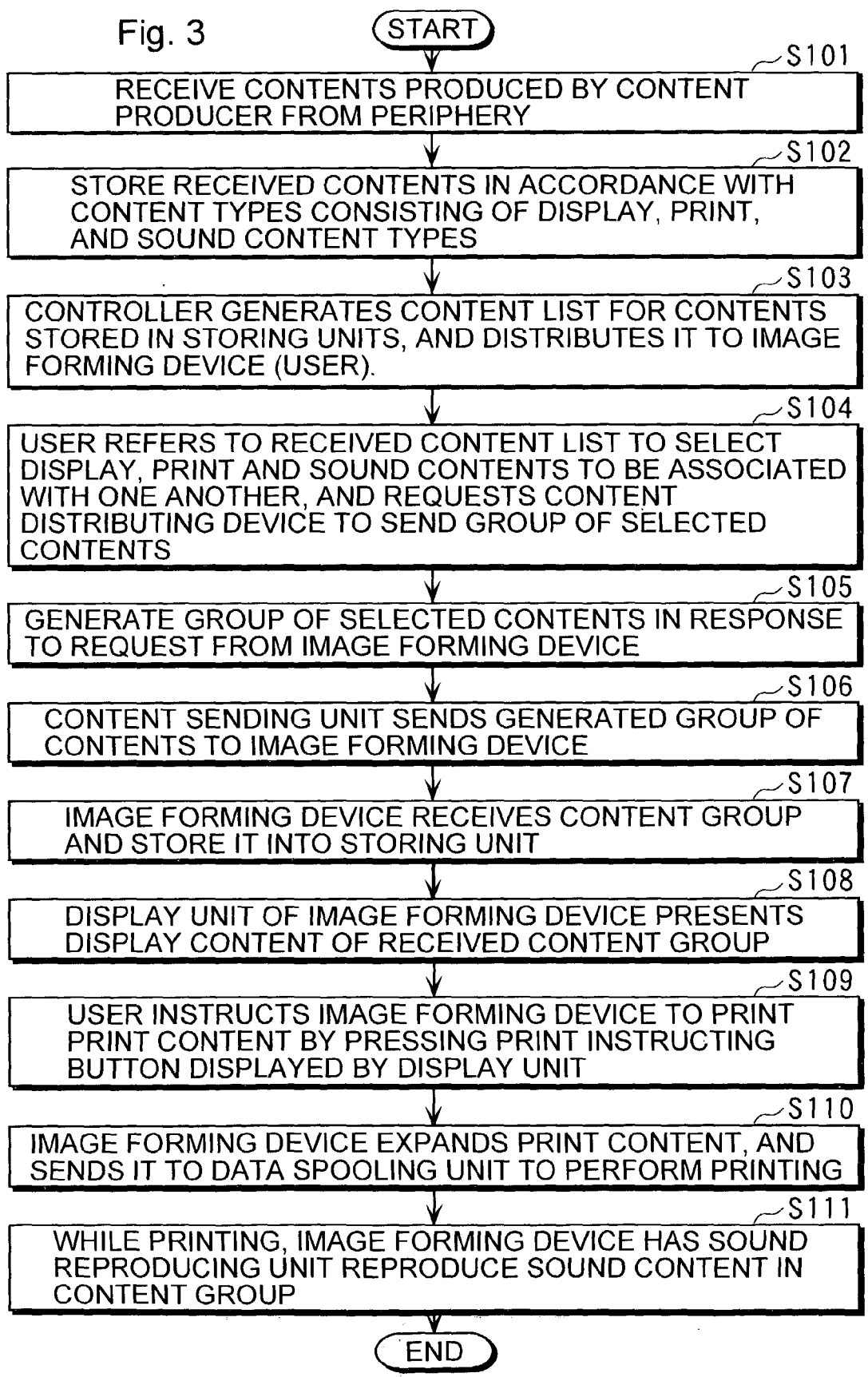

Fig. 11

| FILE CODE | PRINT CONTENT CODE | DISPLAY CONTENT CODE | SOUND CONTENT CODE | OPERATION MODE |
|---|---|---|---|---|
| 1 | P00801 | V00101 | M00401 | |
| | P00802 | V00102 | S006 | |
| | P00803 | V00103 | M00403 | |
| | P00804 | V00104 | M00404 | |
| | P00812 | V00112 | M00412 | 2 |

Fig. 17A

| GROUP ID | CALLER ID | RINGING SOUND ID |
|---|---|---|
| A | 0002 | 007 |
| A | 0003 | 007 |
| A | 0011 | 007 |
| B | 0001 | 035 |
| C | 0123 | 021 |

Fig. 17B

| CALLER ID | CALLER ADDRESS |
|---|---|
| 0001 | fullbank@rideon.or.jp |
| 0002 | highpeak@pine.ne.jp |
| 0003 | highside@road.gr.jp |

IMAGE FORMING DEVICE CAPABLE OF REPRODUCING SOUND, AND CONTENT REPRODUCING METHOD

BACKGROUND OF THE INVENTION (1) Field of the Invention

The present invention relates to an image forming device capable of reproducing sound while printing, and a content reproducing method.

(2) Description of Related Art

The recent explosive use of the Internet and i-mode® realizes a variety of data distribution services available in homes. In addition, new services for distributing high-capacity video and sound data have also begun as a result of widespread use of broadband communication networks with a high transmission rate of about 500 kilobytes per second (kbps) or higher. Such broadband communication has been realized by wired communication technology, such as optical fibers, cable television (CATV), and xDSL (digital subscriber line), and by wireless communication technology, including FWA (Fixed Wireless Access) and IMT-2000 (International Mobile Telecommunication 2000) defined by the International Telecommunications Union as the next-generation mobile communication technique.

A conventional image forming device has been used mainly for printing image data. In homes, use of the image forming device is usually restricted to printing, such as for images taken by a digital still camera (DSC), documents processed by a personal computer (PC), greeting cards, e-mails, and web pages.

With the stated widespread use of the broadband networks, it is expected that a wider variety of contents will be distributed to homes. For instance, a print content, which has been conventionally distributed by itself, may be distributed with other types of contents, such as a display content to display and a sound content, which are associated with the print content.

The conventional image forming device with its use restricted to printing, however, cannot process such print content in synchronization with processing of other types of contents.

SUMMARY OF THE INVENTION

The present invention is made in view of the above problems. Therefore, an object of the present is to provide an image forming device and a content reproducing method for conducting printing in synchronization with the reproduction of display and sound contents.

The above object can be achieved by an image forming device that has sound reproducing capability. This image forming device includes: a printing unit operable to print a print content; and a sound reproducing unit operable to reproduce a sound content in synchronization with printing of the print content.

The above image forming device is capable of printing a print content synchronously with the reproduction of a sound content. While the image forming device prints the print content, the user can enjoy listening to a sound content which may be music, or a voice message that tells the user about information on the print content currently being printed. The user can therefore wait for the end of printing without being bored, or know information on the print content currently being printed even when he is not beside the image forming device.

The above object can be also achieved by a content distributing method that includes: a step of producing a content group including a print content and a sound content that are associated with each other; and a step of sending the produced content group to the image forming device. The above object can be also achieved by a content reproducing method including: a receiving step of receiving, from a content distribution server, a content group that contains a print content and a sound content associated with each other; a printing step of printing the print content in the received content group; and a reproducing step of reproducing the sound content associated with the print content in synchronization with the printing step.

According to the above content distributing method and the content reproducing method, the content distributor associates a print content with a sound content to produce a content group, and distributes the content group to an image forming device. Upon receiving the content group, the image forming device prints the print content in the content group synchronously with the reproduction of the sound content. When the content distributor thus associates a print content with a sound content before distribution, the image forming device can easily reproduce the sound content synchronously with printing of the print content. Similarly, display of a display content may be also performed synchronously with printing of a print content. Thus, reproduction of a variety of types of contents can be synchronized with printing of a print content according to the above methods of the present invention.

The present invention may be also embodied as a content distributing device that distributes a group of contents to the image forming device, and as a broadcast system or a content distributing system that includes the image forming device and the content distributing device. The present invention may be also achieved as a content distributing method or a content reproducing method that includes characteristic processing steps of the broadcast system or the content distributing system. The present invention may be also embodied as a program to have a computer perform these processing steps. Such program may be, of course, distributed via communication channels and computer-readable recording media, such as a CD-ROM (Compact Disc-Read-Only Memory).

BRIEF DESCRIPTION OF THE DRAWINGS

These and the other objects, advantages and features of the invention will become apparent from the following description thereof taken in conjunction with the accompanying drawings which illustrate specific embodiments of the invention.

In the drawings:

FIG. 3 is a flowchart showing an operation of a content distributing device of the content distributing system and the image distributing device shown in FIG. 2;

FIG. 11 is an example code table that associates print, display, and sound contents with one another and that shows the set operation mode;

FIG. 17A is an example table generated by a group registering unit shown in FIG. 16;

FIG. 17B is an example address table that associates each caller ID with a different caller address.

DETAILED DESCRIPTION OF THE PREFERRED EMBODIMENTS

The following specifically describes embodiments of the present invention with reference to drawings.

First Embodiment

The first embodiment of the present invention describes a content distributing system. In this content distributing system, a content distributing device generates a group of contents, including a print content, a display content, and a sound content that are associated with one another, and sends the generated content group to an image forming device. Upon receiving the content group, the image forming device reproduces the sound content and displays the display content in synchronization with printing of the print content. The following first describes the image forming device in the content distributing system with reference to FIG. 1.

Figure 1:
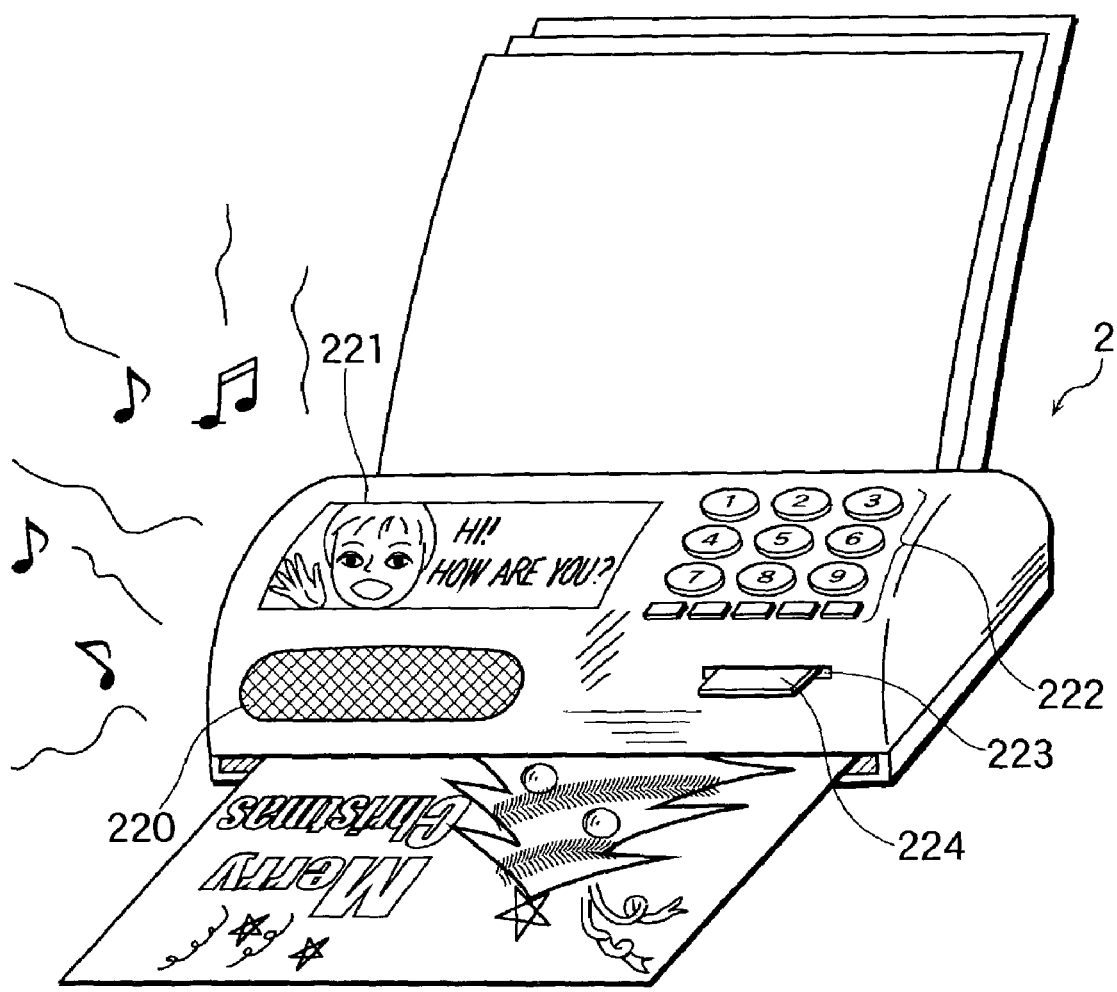
FIG. 1 shows an external view of an image forming device of the first embodiment according to the present invention.

FIG. 1 shows an external view of the image forming device 2 of the present embodiment. The image forming device 2 includes a speaker 220, a display unit 221, an input operational unit 222, an IC (Integrated Circuit) card slot 223, and an IC card 224.

The speaker 20 outputs sound and music reproduced from the sound content. The display unit 221 contains a liquid crystal (LC) panel, and displays an entry screen and the display content that are sent from the content distributing device. The input operational unit 222 contains keys such as numeric keys. While viewing the entry screen displayed by the display unit 221, the user operates the input operational unit 222 to input data to the displayed entry screen. The above numeral keys and the like of the input operational unit 222 may be buttons displayed by the display unit 221. The IC card 224 is inserted into the IC card slot 223 so as to be mounted on the image forming device 2. The IC card 224 is a memory card, such as an SD (Secure Digital) card, and stores music recorded by the user, and a content list that associates the print content, the display content, and the sound content with one another and that is sent from the content distributing device in advance.

As shown in FIG. 1, it is not necessary that the print content printed on paper and the display content displayed by the display unit 221 are the same image as long as the print content and the display content are associated with each other by either the content distributing device or the user of the image forming device 2. Similarly, the sound content outputted by the speaker 220 may be any content if it is associated with the print content and the display content. For instance, the print content may be data representing an image of a Christmas card and be associated with a display content representing an image of an idol singer greeting and with a sound content that is audio data of a hit song of the singer. In this case, the image forming device 2 has the display unit 221 display the image of the singer greeting and has the speaker 220 output the hit song in synchronization with printing of the Christmas card.

Figure 2:
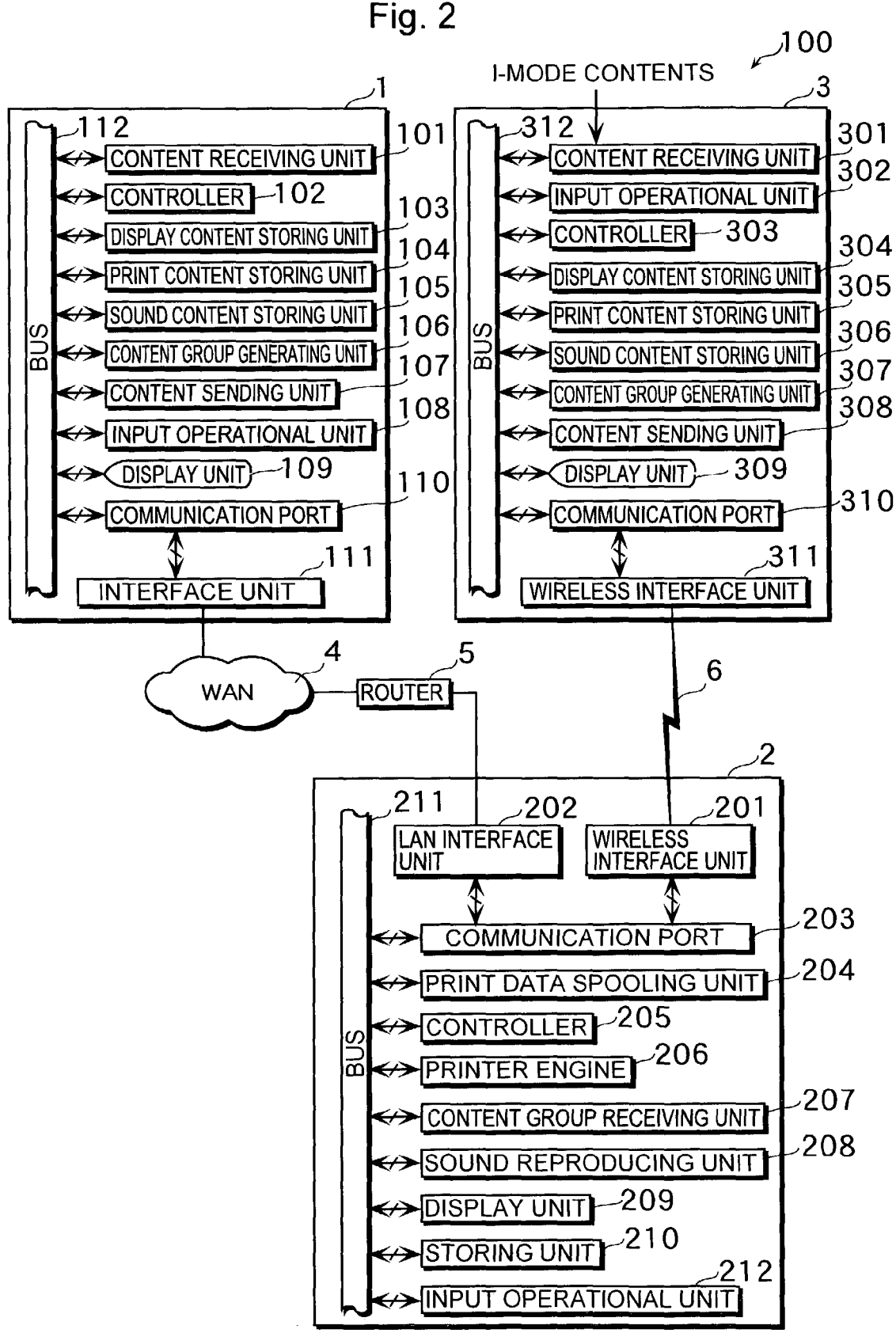
FIG. 2 is a block diagram showing the construction of a content distributing system that includes the image forming device shown in FIG. 1.

FIG. 2 is a block diagram showing the construction of the content distributing system 100 including the image forming device 2 shown in FIG. 1. In this content distributing system 100, the content distributing device 1 or a mobile terminal 3 sends a group of contents to the image forming device 2, which then reproduces a display content and a sound content included in the sent content group in synchronization with printing of a print content included in the same content group. The content distributing system 100 comprises the content distributing device 1, the image forming device 2, and the mobile terminal 3. The image forming device 2 is installed in homes and connected to the content distributing device 1 via a wide area network (WAN) 4 and a router 5. Usually a firewall is provided to a computer system connected with a LAN or the like to the content distributing device 1 so as to prevent unauthorized access, although such a firewall is omitted from FIG. 2 and will not be described. The image forming device 2 is also connected to the mobile terminal 3 via a wireless network 6. The content distributing device 1 is a content server that distributes a content via the Internet to terminal devices in homes. The content distributing device 1 generates the group of contents including the display content, the print content, and the sound content associated with one another, and sends the generated group of contents to the image forming device 2. The image forming device 2 receives the content group from either the content distributing device 1 or the mobile terminal 3, and reproduces the sound content while printing the print content in response to a printing instruction based on the display content. The mobile terminal 3 obtains a sound content and an image via the wireless network 6 and the like, associates the sound content with the image to produce a group of contents, and sends the group of contents to the image forming device 2. Some of the peripheral units, such as the display unit 309, of the mobile terminal 3 may be used by the image forming device 2.

Content Distributing Device

The content distributing device 1 is a general-purpose computer including hard disk and the like storing a database, and comprises a communication port 110, an interface unit 111, a bus 112, a content receiving unit 101, a controller 102, a display content storing unit 103, a print content storing unit 104, a sound content storing unit 105, a content group generating unit 106, a content sending unit 107, an input operational unit 108, and a display unit 109. Note that the content distributing device 1 is not limited to the server on the Internet, but may be a server that transmits contents written in Broadcast Markup Language (BML) via a digital broadcast, or a server that transmits i-mode contents via a public phone network.

The content receiving unit 101 receives a content, which is received either from a content producer via the WAN 4 or through off-line operation on the input operational unit 108.

The controller 102 receives a user operation via the input operational unit 108 and controls the whole operation of the content distributing device 1.

The display content storing unit 103 is a region storing display contents received by the content receiving unit 101.

The print content storing unit 104 is a region storing print contents received by the content receiving unit 101.

The sound content storing unit 105 is a region storing sound contents received by the content receiving unit 101.

The content group generating unit 106 generates a group of contents, including a display content, a print content, and a sound content that are stored in the content storing units 103, 104, and 105, respectively, and that are associated with one another.

The content sending unit 107 sends the generated content group outside the content distributing device 1 via the aforementioned communication function.

The input operational unit 108 includes push buttons, a mouse, and a keyboard to receive a user instruction.

The display unit 109 displays an entry screen that may be used when the content producer registers a content on the content distributing device 1 via the input operational unit 108. The display unit 109 also displays information on contents sent from the content producer via the WAN 4.

The communication port 110 is connected to the WAN 4 via the interface unit 111 and communicates with devices outside the content distributing device 1. The interface unit 111 converts parallel data received from the communication port 110 into serial data to send the serial data via the WAN 4, and converts serial data received from the WAN 4 into parallel data to input the parallel data to the communication port 110.

The bus 112 is a parallel-data channel that transfers the parallel data between each unit of the content distributing device 1.

Image Forming Device

The image forming device 2 comprises a wireless interface unit 201, a LAN (local area network) interface unit 202, a communication port 203, a print data spooling unit 204, a controller 205, a printer engine 206, a content receiving unit 207, a sound reproducing unit 208, a display unit 209, a storing unit 210, a bus 211, and an input operational unit 212.

The wireless interface unit 201 receives serial data via the wireless network 6 such as a mobile phone network, converts the serial data into parallel data suited to be processed inside the image forming device 2. The wireless interface unit 201 also receives parallel data from the communication port 203, and converts it into serial data to be sent via the wireless network 6.

The LAN interface unit 202 receives serial data via the router 5 and the WAN 4, and converts the received serial data into parallel data suited to be processed inside the image forming device 2. The LAN interface unit 202 also receives parallel data from the communication port 203, and converts the received parallel data into serial data to be sent via the WAN 4.

The communication port 203 is connected to the WAN 4 and the wireless network 6 via the LAN interface unit 202 and the wireless interface unit 201 to communicate with devices outside the image forming device 2.

The print data spooling unit 204 receives print data, which has been produced by the controller 205 by expanding a print content, and spools the print data on a hard disk to send it to the printer engine 206. That is to say, the print data spooling unit 204 uses a high-speed auxiliary storage as a buffer storing the print data to reduce a data transfer time taken for the controller 205 to send the print data to the printer engine 206 and so that the controller 205 can perform an operation other than printing without delay.

The controller 205 is a CPU (central processing unit) that executes a control program. After a content group is received from outside the image forming device 2, such as the content distributing device 1, and stored in the storing unit 210, the controller 205 associates a print content, a display content, and a sound content in the stored content group with one another, and controls units that process these contents so that their operations synchronize with one another. The controller 205 also expands the print content into print data suited to be processed by the printer engine 206, the display content into display data suited to be processed by the display unit 209, and the sound content into sound data suited to be processed by the sound reproducing unit 208.

The controller 205 then outputs the expanded data to the respective units 206, 209, and 208.

The printer engine 206 prints the print data sent from the print data spooling unit 204. This printer engine 206 may use any printing method, such as a thermal transfer method (sublimatic or thermo-fusing type), a thermal method, an inkjet method, and an electrophotographic method.

The content receiving unit 207 receives content groups of various types from a device outside the image forming device 2, and places each received content group into the storing unit 210.

The sound reproducing unit 208 includes the speaker 220 shown in FIG. 1, and reproduces the sound data expanded by the controller 205 while the print data is printed.

The display unit 209 is the display unit 221 shown in FIG. 1, and displays an image that is associated with the print data and that is obtained from the display data expanded by the controller 205. The display unit 209 also displays a list, which associates one content with another to make up a group of contents, and an entry screen used for the user to associate contents with one another. The display unit 109 may also display different types of buttons used for entering data to the entry screen and for instructing printing of the print data.

The storing unit 210 is the IC card 224 such as the SD card described with reference to FIG. 1.

The bus 211 is a channel that transfers parallel data to/from each unit of the image forming device 2.

The input operational unit 212 is the input operational unit 222 shown in FIG. 1, and may be push buttons, numerical keys, and the like provided to the image forming device 2, and buttons displayed by the display unit 209.

Mobile Terminal

The mobile terminal 3 is a phone, a PDA (personal digital assistant), or the like which has a function to display a content such as an i-mode® content. The mobile terminal 3 receives a content written in Compact Hyper Text Markup Language (CHTML) or the like via the Internet from the content distributing device 1, and displays the received content. From this mobile terminal 3 via the wireless network 6, the image forming device 2 receives a content such as the i-mode content. The mobile terminal 3 comprises a content receiving unit 301, an input operational unit 302, a controller 303, a display content storing unit 304, a print content storing unit 305, a sound content storing unit 306, a content group generating unit 307, a content sending unit 308, a display unit 309, a communication port 310, a wireless interface unit 311, and a bus 312. These units are connected to one another via the bus 312.

The content receiving unit 301 receives a content such as an i-mode content from the content distributing device 1, so that the display unit 309, which may include an LC display, displays the received content.

The input operational unit 302 includes numeric keys, and different types of push buttons, such as a calling button and a power button, to accept user input operations for entering a phone number and text for e-mail and for setting a play mode for the sound content by entering numerals, characters, and symbols and moving a cursor.

The controller 303 is a CPU that executes a control program, and controls each unit of the mobile terminal 3 in accordance with a user instruction received via the input operational unit 302.

The display content storing unit 304 stores a display content received by the content receiving unit 301.

The print content storing unit 305 stores a print content received by the content receiving unit 301.

The sound content storing unit 306 stores a sound content received by the content receiving unit 301.

In accordance with a user instruction received by the input operational unit 302, the content group generating unit 307 associates the stored display content, print content, and sound content with one another to produce a content group.

The content sending unit 308 sends the produced content group to the image forming device 2 by using the stated communication function.

The display unit 309 displays a display content distributed by the content distributing device 1 via the Internet, and also displays web pages and a list that associates one content with another.

The communication port 310 is connected to the wireless network 6 via the wireless interface unit 311 to communicate with devices outside the mobile terminal 3.

The wireless interface unit 311 receives serial data from the wireless network 6 such as the mobile terminal network, and converts the received serial data to parallel data suited to be processed inside the mobile terminal 3. The wireless interface unit 311 also converts parallel data outputted from the communication port 310 into serial data to be sent via the wireless network 6.

The following describes operations of the above content distributing device 1 and the image forming device 2 with reference to a flowchart of FIG. 3.

The content distributing device 1 receives a display content, a print content, and a sound content from outside the content distributing device 1 via a network such as the WAN 4 (step S101). The content distributing device 1 then stores the received three types of contents into the display content storing unit 103, the print content storing unit 104, and the sound content storing unit 105, respectively, according to a type of each content (step S102). It is alternatively possible for the content distributing device 1 to receive the above contents offline in step S101 either via a transportable recording medium such as an optical disc and semiconductor memory, or through an operation by the content producer using the input operational unit 108 to store the contents.

The controller 102 of the content distributing device 1 generates a content list for contents stored in the display, print, and sound content storing units 103, 104, and 105, and sends the generated content list to the image forming device 2 of the user via the WAN 4 (step 5103). Note that this content list does not have to be generated by the controller 102, but may be generated by the content producer and sent to the content distributing device 1 in advance together with the contents. Alternatively, the content list produced by the content producer may be directly distributed to users of the content distribution service via magazines, newspapers, the Internet, and the like.

Upon receiving the content list via the WAN 4, the user of the image forming device 2 selects desirable display, print, and sound contents from the list, and requests the content distributing device 1 to send the selected contents (step 5104). Certain display, print, and sound contents in the content list may be associated with one another beforehand by the content producer, although this is not necessary. That is to say, the user may associate the selected contents with one another.

Upon receiving the request from the image forming device 2, the content distributing device 1 associates the requested contents with one another to produce a group of these contents (step S105). When the content producer has earlier associated these contents with one another and unless the user makes a request to change the association, the content distributing device 1 may skip this associating operation and only produce the group of contents.

The content sending unit 107 of the content distributing device 1 sends the produced content group to the image forming device 2 via the bus 112, the communication port 110, the interface unit 111, and the WAN 4 (step S106).

The image forming device 2 receives the content group via the LAN interface unit 202, the communication port 203, and the bus 211, and stores the content group into the storing unit 210 (step S107).

The controller 205 of the image forming device 2 extracts the display content from the received content group, and has the display unit 209 display the extracted display content (step S108). The displayed display content includes images and a print instructing button. The user views the images displayed by the display unit 209 to recognize the print content, and presses the print instructing button to start the printing (step S109).

The controller 205 of the image forming device 2 extracts the print content from the received content group, and sends print data of the extracted print content to the print data spooling unit 204, which then spools the print data. The spooled data is sequentially sent to the printer engine 206, which prints the print data (step S110).

The controller 205 also extracts the sound content from the same content group, and sends sound data for the extracted sound content to the sound reproducing unit 208. The sound reproducing unit 208 reproduces the sound data while the printer engine 206 prints the print data (step s111).

Figure 4B:
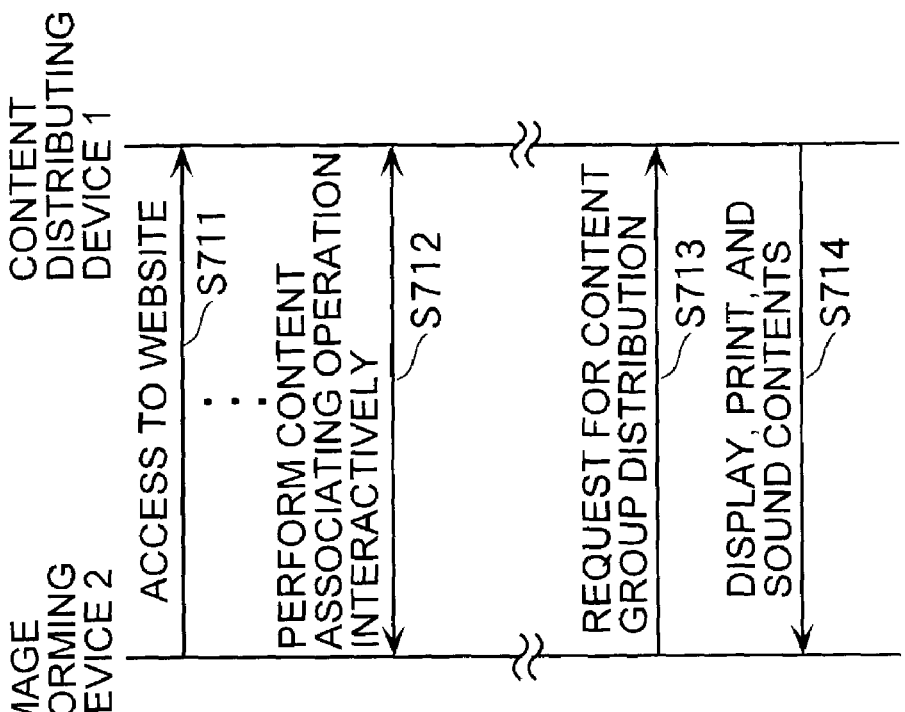
FIG. 4B shows a state in which the user of the image forming device has the content distributing device perform an association operation online, and receives a content group from the content distributing device.
Figure 4A:
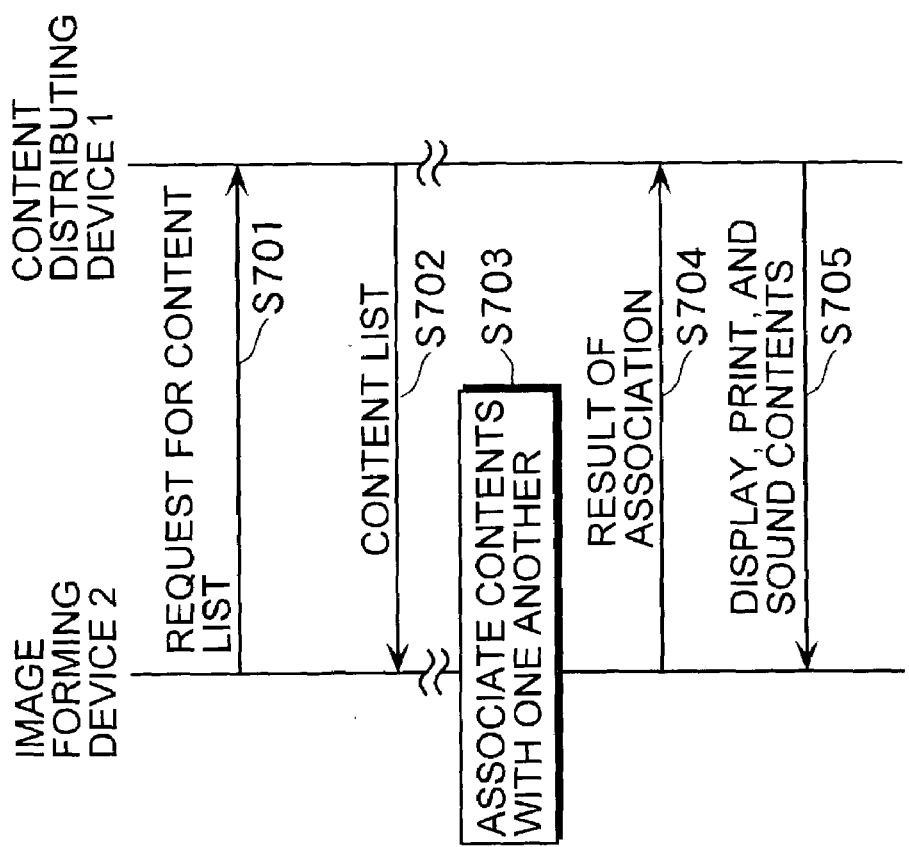
FIG. 4A is a sequence diagram showing a state in which the image forming device receives a content list from the content distributing device in advance, associates one content with another, and receives a content group from the content distributing device.

FIGS. 4A and 4B are sequence diagrams showing operations for the content distributing device 1 to send the content group to the image forming device 2. FIG. 4A shows a case in which the image forming device 2 receives the content list from the content distributing device 1 in advance, and associates one content with another. FIG. 4B shows a case in which the user of the image forming device 2 has the content distributing device 1 perform this association operation online by communicating with the content distributing device 1.

In the case of FIG. 4A, the user requests the content distributing device 1 to send the content list (step S701). Responding to this request, the content distributing device 1 sends the content list to the image forming device 2 (step S702). Upon receiving the content list, the image forming device 2 stores the content list into the storing unit 210 and has the display unit 209 display the content list. After this, the user performs the following operation that may be performed offline. The user refers to the received content list to select a desirable print content and display and sound contents to be associated with the print content. The user then generates a code table that associates the selected contents with one another and that shows an operation mode selected by the user (step S703). The user then sends the generated code table to the content distributing device 1 to request the content distributing device 1 to send the selected contents shown in the code table (step S704). Upon receiving the code table, the content distributing device 1 produces a group of the contents shown in the code table, and sends the produced content group to the image forming device 2 (step S705).

In the case of FIG. 4B in which the user conducts an associating operation online, the image forming device 2 accesses the website of the content distributing device 1 (step S711) so that an interactive screen is sent from the content distributing device 1 to the image forming device 2. The user enters data to the interactive screen that contains a content list so as to select, from the content list, a desirable print content, and display and sound contents the user wishes to associate with the print content, associates the selected contents with one another, and selects an operation mode (step S712). In accordance with the contents associated with one another and the selected operation mode inputted to the interactive screen, the content distributing device 1 produces a code table, and sends the code table to the image forming device 2. The content distributing device 1 also adds this code table to the database stored in the content group generating unit 106. This database stores a different code table for each user. Upon receiving the code table, the image forming device 2 stores the code table into the storing unit 210. The user of the image forming device 2 logs onto the website of the content distributing device 1, and designates a file code of the content group in accordance with the stored code table to request the content distributing device 1 to send the content group (step S713). Upon receiving the request, the content distributing device 1 generates the content group specified by the designated file code, and sends the content group to the image forming device 2 (step S714).

As has been described, the image forming device 2 receives the group of contents that are associated with one another, and prints the print content in the content group in response to the printing instruction received via the screen while reproducing the sound content. This only describes a general example operation of the image forming device 2, and the following specific operation may be performed by using the image forming device 2. For instance, display and print contents for an image of a birthday card are associated with a sound content that is a congratulatory voice message. When the group of these contents is sent to the user, the user can listen to the congratulatory voice message while having the birthday card printed. As another example, a group of contents associated with one another may be the following: a display content for an image of an idol singer; a print content for images of the singer's album jacket, a sheet of the singer's music, and a lyric sheet of the singer's song; and a sound content that is the song and a voice message. When this content group is sent to the user, the user can listen to the song and the message while having the jacket image, the music sheet, and the lyric sheet printed.

Note that the use of the present invention is not limited to the above specific examples. Any display, print, and sound contents may be associated with one another as a group even when they have no connection with each other. The present invention adds an entertainment aspect to a user's printing operation by reproducing a sound content associated with the printed data.

The following describes operations for the image forming device 2 to switch reproduction from one sound content to another in accordance with one of the following units of the print content: (1) the print content itself (or a content print file); (2) a page of the print content; and (3) a set of images within a page of the print content.

Figure 5A:
FIG. 5A shows an example of a print content printed by the image forming device as a single page containing a single set of images.
Figure 5B:
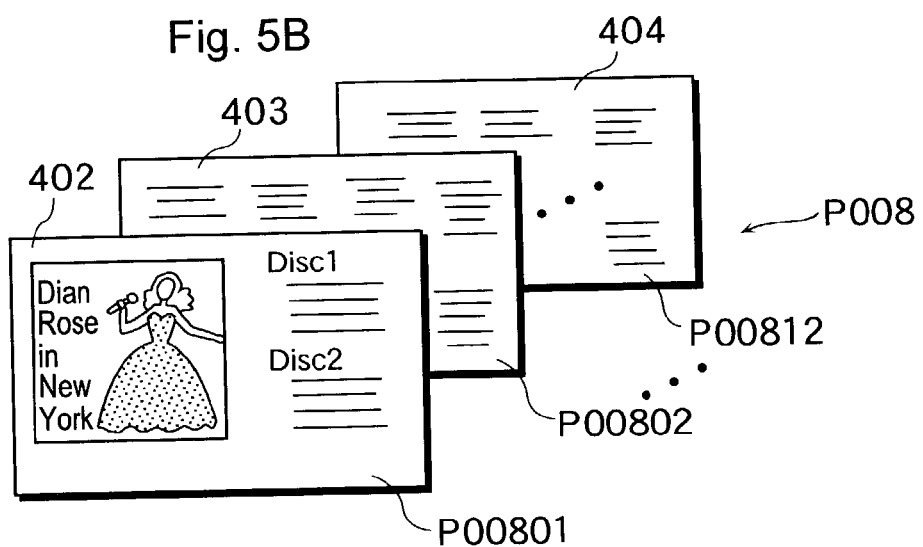
FIG. 5B shows an example of another print content printed as a plurality of pages.
Figure 5C:
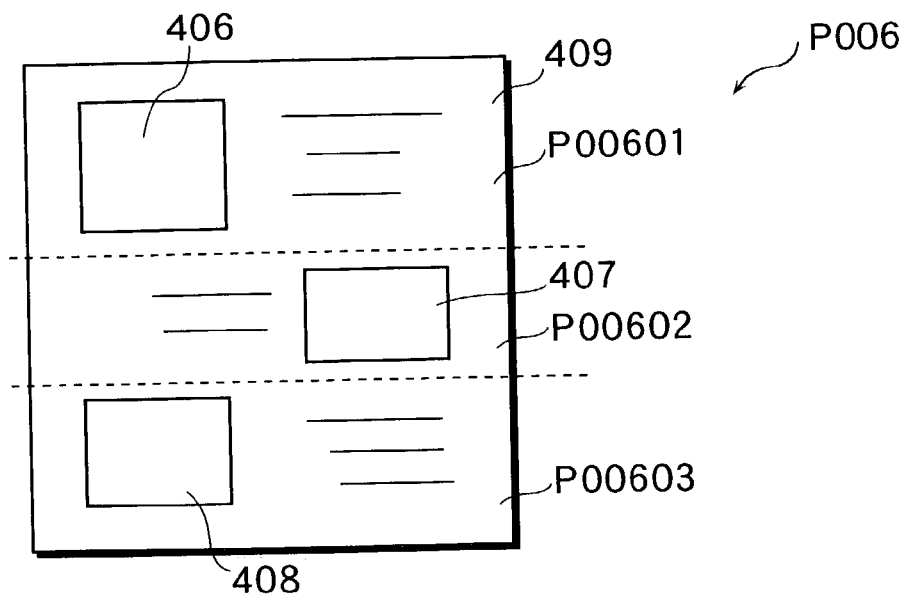
FIG. 5C shows an example of another print content printed as a single page containing a plurality of set of images.

FIGS. 5A–5C show examples of the results of printing a print content. FIG. 5A shows an example of a print content printed as a single page containing a single image. FIG. 5B shows an example of another print content printed as a plurality of pages. FIG. 5C shows an example of another print content printed as a single page containing a plurality of sets of images.

A greeting card, such as a Christmas card 401 and a birthday card, is likely to be printed as a single sheet of paper containing a single set of images, as shown in FIG. 5A. When printing such print content, the image forming device 2 changes reproduced display and sound contents in accordance with each print content with reference to an association between the contents specified by either the content distributing device 1 or the user. For instance, assume that the print content of the Christmas card 401 is associated with a display content that is video images of an idol singer and with a sound content that is a Christmas greeting from the singer accompanied with the singer's hit song. Also assume that another print content distributed next is a notice of a new home address and is associated with a display content that is a video of changing scenery through a train window and with a sound content that is a song relating to a region around the new home. When these two groups of contents are sent to the user of the image forming device 2, the user can first enjoy listening to the Christmas greeting from the idol singer accompanied by her hit song reproduced by the sound reproducing unit 208 while having the Christmas card 401 printed and viewing the video of the singer displayed by the display unit 209. After printing the Christmas card 401, the user can print the notice of the new home address while viewing the video of the changing scenery displayed by the display unit 209 and listening to the song of the region. It is also possible for the user of the image forming device 2 to send a group of contents as a gift to a user of another image forming device 2 so that the user who has received the content group can enjoy the group of contents.

FIG. 5B shows another example of a print content with a content code "P008", which includes an image of a CD (compact disc) jacket 402 and lyric sheets 403–404 for songs included in the CD. A print content such as this one is likely to be printed over a plurality of pages. In this case, the image forming device 2 changes reproduced display and sound contents whenever the image forming device 2 prints a new page of the print content in accordance with an association specified beforehand. For instance, when the first page of the print content, that is, the CD jacket 402 is printed, the display unit 209 displays a video message from the singer, and the audio reproducing unit 208 reproduces sound of the video message. When the next page of the same print content, that is, the lyric sheet 403 is printed, the display unit 209 displays video of a dancing scene related to a song of the printed lyric and the sound reproducing unit 208 reproduces the song. When printing subsequent lyric sheets such as the sheet 404, the user can similarly enjoy both video and music, which are synchronously reproduced from display and sound contents.

FIG. 5C shows another example of a print content with a content code "P006", which is a sightseeing leaflet 409 including four-season landscape photos and their descriptions. This type of leaflet often includes more than one image within a single page. For such print content, either the content distributing device 1 or the user of the image forming device 2 associates each set of images within the page with a different display content and a different sound content in advance, so that the image forming device 2 can change display and sound contents in accordance with a set of images currently being printed. For the leaflet 409, for instance, a spring landscape photograph 406 and its description are printed while the display unit 209 displays a video of a spring scene and the sound reproducing unit 208 reproduces spring-like sound, such as the murmuring of a stream. A summer landscape photograph 407 and its description are printed while the display unit 209 displays a video of a scene of a summer festival and the sound reproducing unit 208 reproduces sound of the festival scene. A winter landscape photograph 408 and its description are printed while the display unit 209 displays a video for a skiing resort and the sound reproducing unit 208 reproduces narration of sightseeing spots.

Such switching of reproduced display and sound contents in synchronization with a state of a print content is conducted in accordance with an operation mode set by the image forming device 2 in advance for each print content. In the operation mode set as "1", the image forming device 2 changes reproduced display and sound contents in accordance with each print content, as with the case of FIG. 5A. In the operation mode "2", the image forming device 2 changes reproduced display and sound contents in accordance with each page within a print content as with the case of FIG. 5B. (Hereafter, the unit of a content corresponding to such a page is called "a page content".) In the operation mode "3", the image forming device 2 changes reproduced display and sound contents in accordance with each set of images, such as the photograph 406 and its description, of a print content, as with the case of FIG. 5C. (Hereafter, a unit of a content corresponding to such set of images within a print content is called "a sectional content"). In this way, the user of the image forming device 2 can enjoy viewing images and listening to sound in accordance with a printing state.

Figure 6:
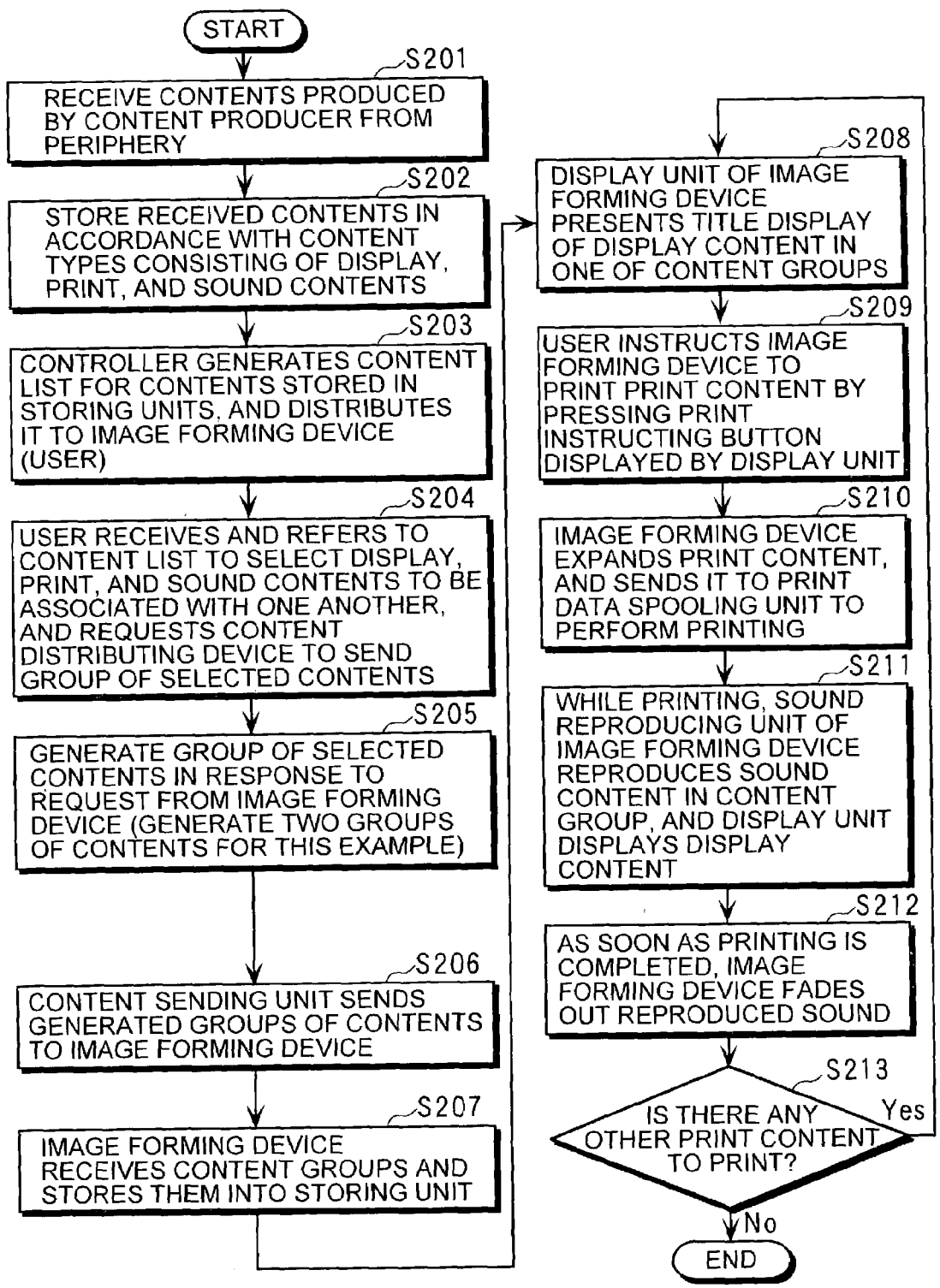
FIG. 6 is a flowchart showing an operation performed by the content distributing device and the image forming device to change a reproduced display and sound contents in accordance with each complete print content.

The following describes the operation to change reproduced display and sound contents for each print content with reference to a flowchart of FIG. 6, which shows this operation performed by the content distributing device 1 and the image forming device 2. Here, the operation that is the same as that shown in FIG. 3 will not be described, such as the operation of steps S201–S203 that are the same as steps S101–S103 in FIG. 3.

Upon receiving the content list from the content distributing device 1, the user of the image forming device 2 selects desirable display, print, and sound contents from the content list, and requests the content distributing device 1 to send a group of the selected contents (step S204). Here, assume that this request is made for two content groups to explain the case of changing reproduced sound and display contents for each print content in different content groups.

Upon receiving the request from the image forming device 2, the content distributing device 1 produces the two requested content groups, each of which includes display and sound contents associated with a whole print content (step S205). The content sending unit 107 of the content distributing device 1 sends the produced two content groups to the image forming device 2 (step S206). The image forming device 2 receives the two content groups, and stores them into the storing unit 210 (step S207). The image forming device 2 extracts one of the two content groups, and has the display unit 209 display a display content, which includes a title display and a print instructing button, of the extracted content group (step S208). The user presses the displayed print instructing button to instruct the controller 205 to start the printing (step S209).

The controller 205 of the image forming device 2 has the print data spooling unit 204 spool print data of the print content so that the printer engine 206 prints the print data (step S210). During the printing, the sound reproducing unit 208 reproduces the sound data associated with the print content and the display unit 209 displays the display content (step S211). As soon as printing of the print content ends, the sound reproducing unit 208 stops reproduction of the sound content. When a reproduction time of the sound content is longer than a time taken to print the print content, it is desirable to stop reproduction of the sound content through a fade-out to time it to the end of the printing.

After this printing is completed, the display unit 209 may display a title display of a display content included in the other content group to ask the user whether printing for the other content group should be performed (step S213). When the user presses a print instructing button on this title display, the image forming device 2 repeats the operation of steps S208–S212. On the other hand, when the user instructs to end the printing such as by pressing an end button displayed on the title screen, the image forming device 2 terminates its operation and switches to a standby state.

The printing speed of a print content can differ among image forming devices 2 in accordance with the selected printing mode and specifications of each image forming device 2. As a result, a period between the end time of printing and the end time of sound reproduction can vary among different image forming devices 2 when the sound reproduction speed is fixed. That is to say, even when a time taken to reproduce a sound content associated with a print content for a birthday card, for instance, is specified beforehand in accordance with a printing time calculated for the birthday card at a certain printing speed, the end of the sound reproduction cannot coincide with the end of printing if an image forming device 2 does not print the birthday card at the calculated printing speed. To solve this problem, each individual image forming device 2 may estimate a time to print the birthday card based on its own printing speed, and the sound reproducing unit 208 may adjust the reproduction speed of the sound content in accordance with the estimated printing time so that the end time of printing can roughly coincide with the end time of sound reproduction.

It is alternatively possible to suspend printing of the subsequent print content until reproduction of the present sound content is completed. As soon as the present sound reproduction ends, printing of the subsequent print content may start.

Although it has been described that a print content is printed in synchronization with a display content and a sound content, it is also possible to print a print content in synchronization with only one of a sound content and a display content.

Figure 7:
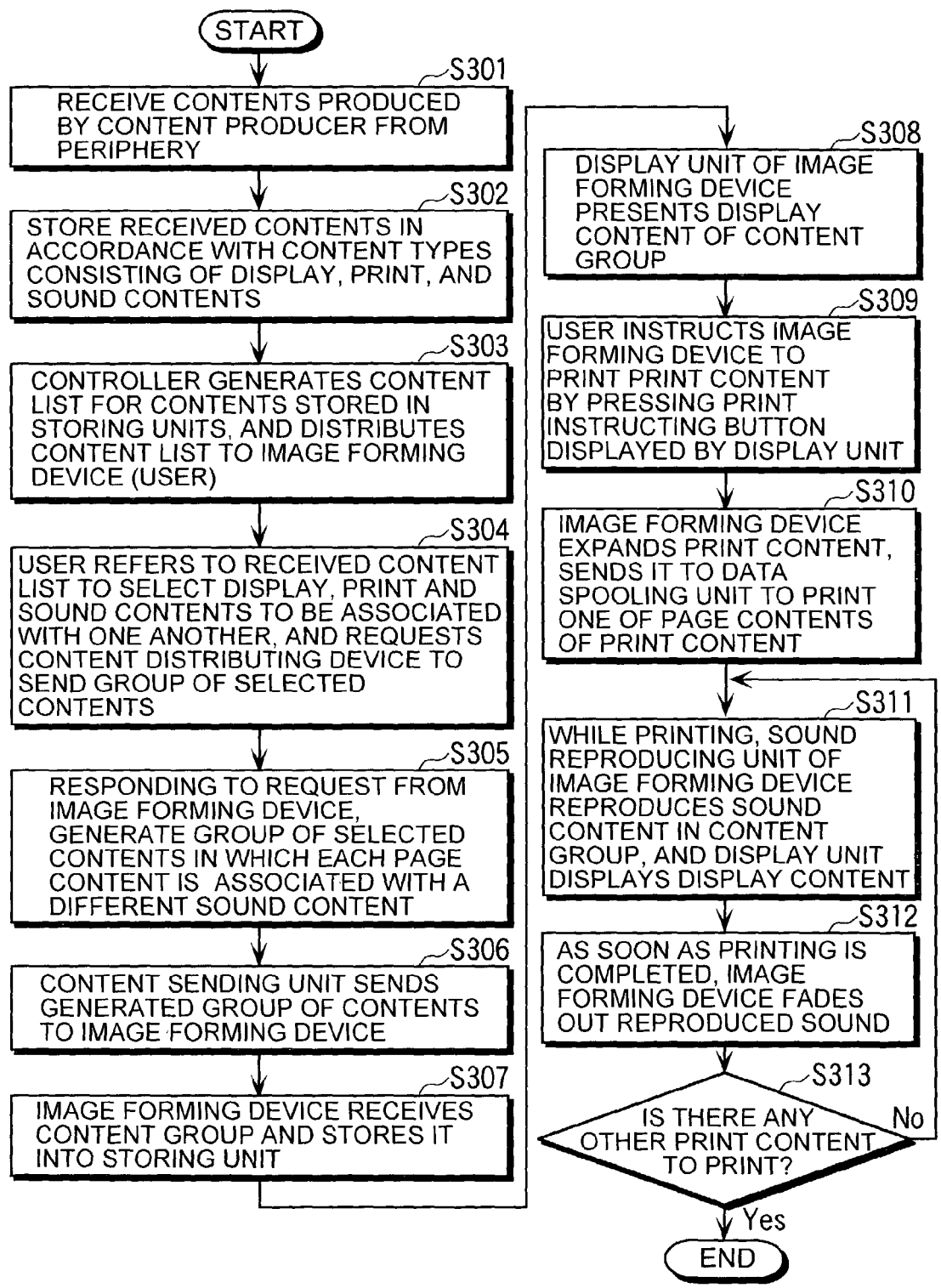
FIG. 7 is a flowchart showing an operation performed by the content distributing device and the image forming device to change a reproduced display and sound contents in accordance with each printed page.

The following describes the operation to reproduce a different sound content for each page content of a print content (hereafter called "a print page content") with reference to a flowchart of FIG. 7, which shows this operation performed by the content distributing device 1 and the image forming device 2. The following description is based on the assumption that the display content is a still image and its display is not synchronized with printing of a print page content. The operation of steps S301–S303 are the same as that of steps S101–S103 in FIG. 3, and therefore will not be described.

Upon receiving a content list from the content distributing device 1, the user of the image forming device 2 selects a display content, print page contents, and sound page contents from the content list, and requests the content distributing device 1 to send a group of the selected contents (step S304). Note that each selected sound page content is reproduced with a different print page content.

Upon receiving the request from the image forming device 2, the content distributing device 1 associates each print page content with a different sound page content and adds the display content to the print page content and to the sound page content so as to produce a group of the contents that are associated with one another (step S305). The content sending unit 107 of the content distributing device 1 sends the produced content group to the image forming device 2 (step S306). The image forming device 2 receives the content group, and stores the received content group into the storing unit 210 (step S307). The image forming device 2 has the display unit 209 display the display content (step S308). The user presses a print instructing button which is displayed as a part of the display content to instruct the controller 205 to start the printing (step S309). The controller 205 of the image forming device 2 has the print data spooling unit 204 spool the print page contents so that the printer engine 206 prints the first page content (step S310).

While the printer engine 206 prints the first page content, the sound reproducing unit 208 reproduces the sound page content associated with the first page content (step S311). As soon as printing of the first page content ends, the sound reproducing unit 208 stops reproduction of the sound page content. When a reproduction time of the sound page content is longer than a printing time of the first page content, it is desirable to stop reproduction of the sound page content through a fade-out (step S312). The controller 205 then judges whether or not printing of all the requested print page contents of the print content has been completed by comparing a number of the printed page contents with a number of the requested page contents that make up the print content (step S313). If printing of all the page contents has not been completed, the image forming device 2 repeats the operation of steps S311–S312. On the other hand, if printing of all the page contents has been completed, the image forming device 2 terminates its operation and switches to a standby state.

Figure 8:
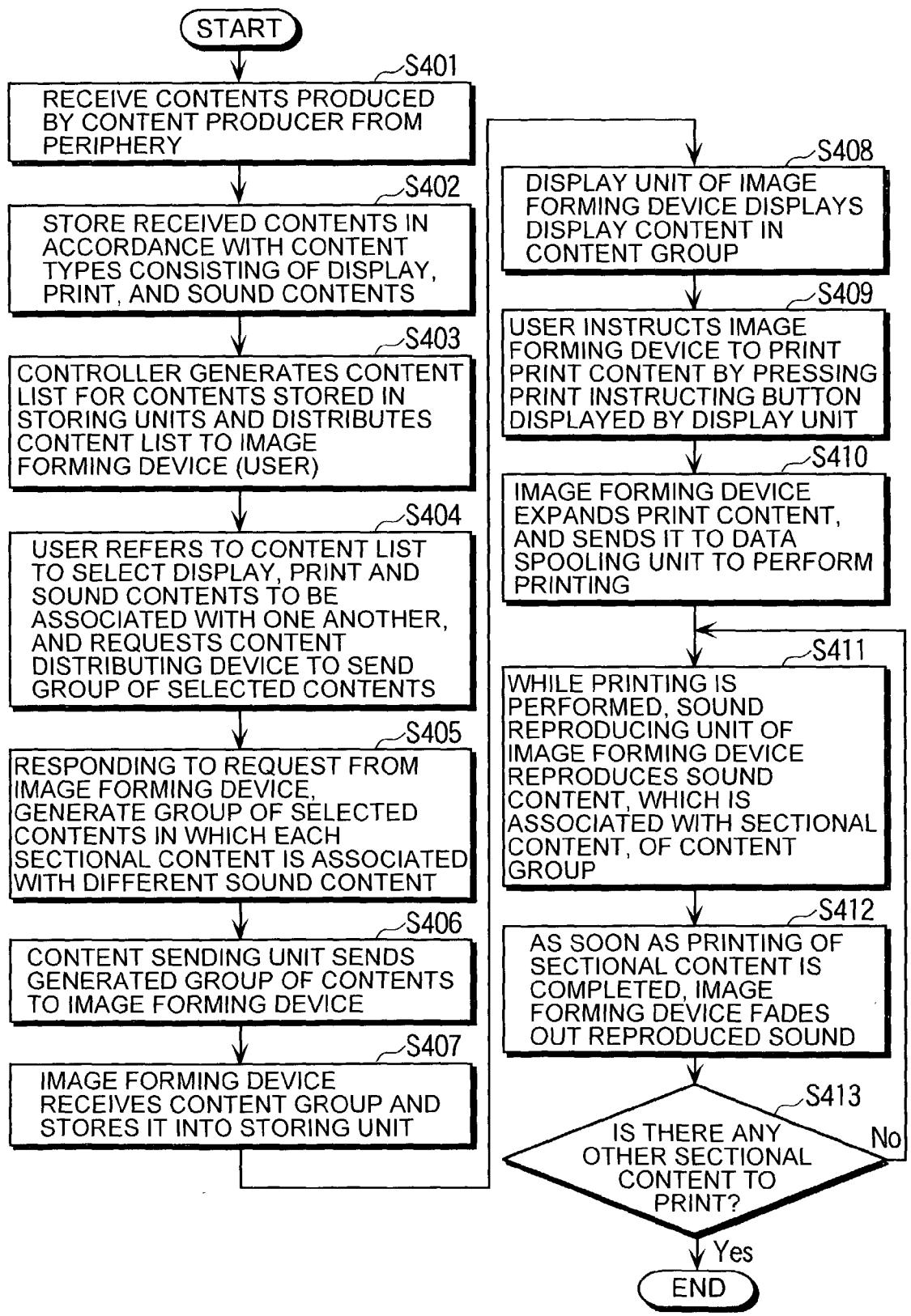
FIG. 8 is a flowchart showing an operation performed by the content distributing device and the image forming device to change a reproduced display and sound contents in accordance with each set of printed images.

The following describes an operation to reproduce a different sound content for each sectional content (constituent unit) within a print content with reference to a flowchart of FIG. 8, which shows the operation performed by the content distributing device 1 and the image forming device 2. Note that operation of steps S401–S403 are the same as that of steps S101–S103 in FIG. 3, and therefore will not be described.

Upon receiving a content list from the content distributing device 1, the user of the image forming device 2 selects, from the content list, a display content, print sectional contents and sound sectional contents that should be associated with one another, and requests the content distributing device 1 to send the selected contents as a content group (step S404). Note that each of the above sound sectional contents selected by the user is associated with a different print sectional content. For instance, a print content containing three sets of images consists of three print sectional contents, each of which is associated with a different sound sectional content.

Upon receiving the request from the image forming device 2, the content distributing device 1 associates each print sectional content with a sound sectional content, and adds the display content to the print sectional contents and the sound sectional contents so as to produce the group of contents that are associated with one another (step S405). The content sending unit 107 of the content distributing device 1 sends the produced content group to the image forming device 2 (step S406). The image forming device 2 receives the content group, and stores the received content group into the storing unit 210 (step S407). The image forming device 2 has the display unit 209 display the display content (step S408). The user presses a print instructing button which is displayed by the display unit 209 to instruct the controller 205 to start printing (step S409). The controller 205 has the print data spooling unit 204 spool the print sectional contents, so that the printer engine 206 prints one of the print sectional contents (step S410). While the printer engine 206 prints the print sectional content, the sound reproducing unit 208 reproduces a sound sectional content associated with this print sectional content (step S411). As soon as printing of this print sectional content ends, the sound reproducing unit 208 stops reproduction of the sound sectional content. When a reproduction time of the sound sectional content is longer than a printing time of the print sectional content, it is desirable to stop reproduction of the sound sectional content through a fade-out (step S412).

The controller 205 then judges whether or not printing of all the requested sectional contents has been completed by comparing a number of the printed sectional contents with a number of the requested sectional contents making up the whole print content (step S413). If printing of all the sectional contents has not been completed, the image forming device 2 repeats the operation of steps S411 and S412. On the other hand, if printing of all the sectional contents has been completed, the image forming device 2 terminates its operation and switches to the standby state.

Figures 9A, 9B:
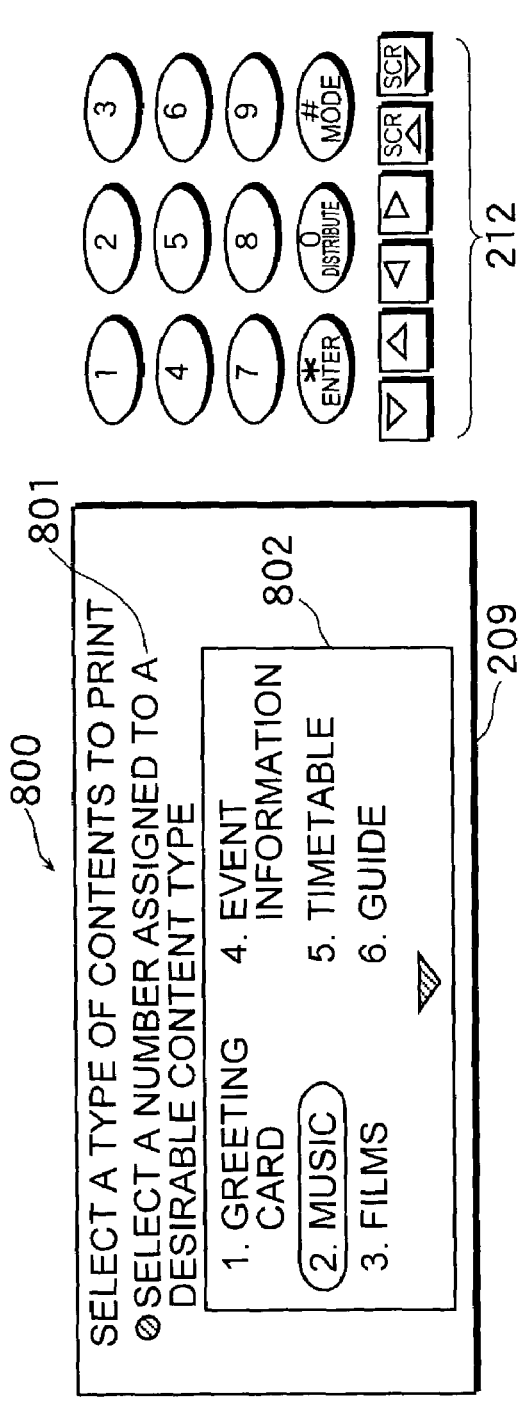
FIG. 9A shows an example entry screen, which is displayed when the image forming device requests the content distributing device to distribute a content list, and also shows an input operational unit provided separately from the entry screen.
FIG. 9B shows the entry screen that includes the input operational unit, which is displayed when the image forming device requests the content distributing device to distribute a content list.

FIGS. 9A and 9B show example entry screens 800 and 801, which are displayed by the image forming device 2 when the user makes a request for a content list to the content distributing device 1. FIG. 9A shows the entry screen 800 along with the input operational unit 212 provided separately from the entry screen 800. FIG. 9B shows the entry screen 810 which includes the input operational unit 212. The entry screen 800 of FIG. 9A is displayed by the display unit 209 when the user presses a distribution request button after the image forming device 2 is switched on. The distribution request button may be achieved by a numerical key "0", for instance, that is pressed by the user for two seconds or longer. The user then selects a desired type of a content list and requests the content distributing device 1 to send the content list of the selected type by operating the input operational unit 212 in accordance with a guidance message 801 displayed on the entry screen 800.

The entry screen 800 also includes a type-entry box 802 that lists types of contents to be distributed by the content distributing device 1. The guidance message 801 prompts the user to select one of the content types listed in the type-entry box 802. The user selects one of the listed content types either by pressing a numeral key of the input operational unit 212 to enter the number specifying a content type, or by pressing a direction key to move a cursor within the type-entry box 802 onto the desired content type and then pressing a key labeled as "ENTER" to confirm the selection.

With the entry screen 810 shown in FIG. 9B, the user selects a desired content type by operating a button displayed on the screen 810 by the display unit 209. A distribution request button 811, however, is provided separately from the entry screen 810. When the user presses this distribution request button 811, the display unit 290 displays the entry screen 810. The display unit 290 displays necessary buttons as the input operational unit 212 in accordance with the content of the entry screen 810. Operationality of the input operational unit 212 of this screen 810 therefore differs from that of the screen 800, although these two screens 800 and 810 otherwise function in basically the same manner. This entry screen 810 includes a guidance message 801 and a type-entry box 802, as in the entry screen 800. The user selects a content type by using this entry screen 810 in basically the same manner as he uses the entry screen 800.

The entry screen 800/810 may either be stored in the storing unit 210 of the image forming device 2 in advance or downloaded from the content distributing device 1 to the image forming device 2 as soon as the distribution request button is pressed. In the former, content types displayed as choices within the type-entry box 802 are updated when the image forming device 2 is connected to the content distributing device 1.

Figures 10A, 10B:
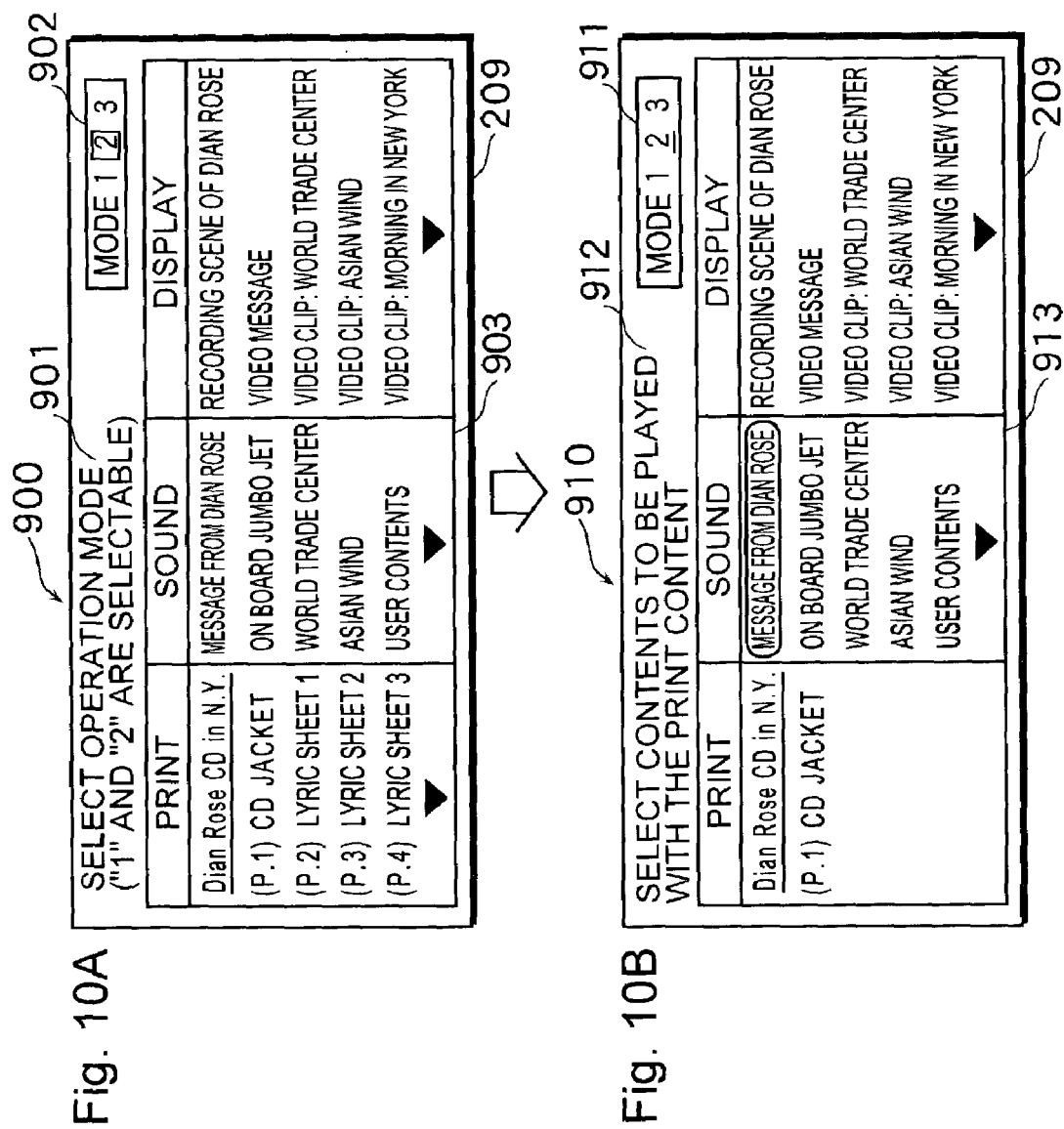
FIG. 10A shows an example entry screen used for the user to set an operation mode in accordance with the distributed content list and a print content he has selected.
FIG. 10B shows an example entry screen used for the user to select contents and associate them with one another in accordance with the set operation mode.

FIGS. 10A and 10B show example entry screens 900 and 910 that are used for the user to set the operation mode, select desirable contents from a distributed content list, and associate the selected contents with one another. The entry screen 900 is used for setting the operation mode for a print content selected by the user. The entry screen 910 is used for selecting contents and associating them with one another in accordance with the set operation mode.

More specifically, in response to the content list request generated based on data inputted to the entry screen 800/810, the content distributing device 1 sends the content list to the image forming device 2. The controller 205 of the image distributing device 2 then instructs the display unit 209 to display the content list to accept the user's selection of a desirable print content, and then displays the entry screen 900 in accordance with the selected print content. This entry screen 900 accepts a user operation to set the operation mode. Following this, the display unit 209 then displays the entry screen 910, and accepts user operation for selecting display and sound contents to be associated with the selected print content.

The following describes this operation by using a specific example. Upon receiving the content list, the image forming device 2 displays an initial entry screen that prompts the user to select a print content from the content list. This entry screen is similar to the entry screen 900 although some of the displayed data, such as the guidance message, differs from the entry screen 900. This initial entry screen may contain only items of "PRINT" contents as choices. When the user selects a print content, "Dian Rose CD in N.Y.", for instance, and presses the "ENTER" key, the entry screen 900 is displayed.

The selected print content name "Dian Rose CD in N.Y." is underlined on this entry screen 900 within a content selection box 903. Names of page contents that make up the print content are listed under this print content. Displaying the page contents in this way allows the user to print a print content in units of page contents. For instance, when the user wishes to only print the third page content, "(P.3) Lyric Sheet 2", selection of the third page content alone is possible.

After the print content is selected on the initial entry screen, the controller 205 changes a representation of a cursor placed on the selected print content name into the underline on the entry screen 900 and displays the guidance message 901, "SELECT OPERATION MODE ("1" AND "2" ARE SELECTABLE)", and a mode selection box 902 that contains a cursor. When the user has selected the third page content "(P.3) Lyric Sheet 2" alone as a desired print content on the initial entry screen, the operation mode is automatically set as "2", and therefore, display of the entry screen 900 is skipped so that the next entry screen 910 is displayed. After the user selects the desired operation mode displayed in the mode selection box 902 of the entry screen 900 and confirms the selection, the entry screen 910 is displayed. The cursor placed on "2" in the mode selection box 901 of the entry screen 900 changes into an underline in a mode selection box 911 of the entry screen 910. In the "PRINT" field within the content selection box 913, a name of one of page contents that make up the selected print content, "Dian Rose CD in N.Y.", is displayed. Thus, page content names of the selected print content are displayed one by one. In the example of FIG. 10B, the first page content, "(P.1) CD JACKET", of the selected print content is displayed. In the content selection box 913, a cursor is placed on a sound content name in the "SOUND" field. Here, the user can move this cursor with direction keys in the input operational unit 212 to one of the display content names in the "DISPLAY" field. In accordance with a guidance message 912 shown as "SELECT CONTENTS TO BE PLAYED WITH THE PRINT CONTENT", the user selects a sound content indicated in the "SOUND" field and a display content indicated in the "DISPLAY" field and confirms the selection. As a result, the selected sound and display contents are associated with the page content displayed in the "PRINT" field. Similarly, other print page contents of the selected print content are also associated with desirable sound and display contents.

The "SOUND" field in the content selection box 913 also includes an item "USER CONTENTS". When the user selects this "USER CONTENTS" item to associate with, for instance, the second print page content and confirms the selection, a list of file names of sound contents stored in the storing unit 210 is displayed. From this list, the user can select a desirable sound content to associate with the second print page content. The sound contents stored in the storing unit 210 include contents obtained beforehand by the user, such as a song downloaded from a Website and a sound recorded by the user on his own. Files of these sound contents have file names given by the user in advance in accordance with a certain rule decided for the content distributing device 1 and the image forming device 2, so that the devices 1 and 2 can recognize the file names written in a code table as names that specify files storing the user contents. The "SOUND" field may also contain an item shown as "NO SOUND" although it is not shown in FIG. 10B. When this item is selected, no sound is reproduced with the selected print content.

With the above example, when the operation mode is "2", the user associates each page content of the selected print content with a sound page content and a display page content, although this is not necessary. For instance, with the operation mode set as "2", the user may associate the whole print content, instead of each page content (constituent unit of the print content), with a sound content and a display content that correspond to the entire print content. As a result, each print page content that makes up the whole print content is automatically associated with sound and display page contents that make up the sound and display contents.

The print, display, and sound contents associated by the user with one another via the entry screens 900 and 910 are represented as a code table. FIG. 11 shows an example code table 501 showing these contents and the operation mode set by the user as "2". The following describes the code table 501 based on the print content with the content code "P008" shown in FIG. 5B as an example. The code table 501 is sent by the image forming device 2 to the content distributing device 1 together with a request command that requests distribution of a content group. The image forming device 2 also stores this code table in the storing unit 210 as a history of such content group requests. When reproducing this content group, the image forming device 2 refers to the stored code table 501.

The code table 501 includes a file code 502, a print content code 503, a display content code 504, a sound content code 505, and an operation mode 506. The file code 502 specifies a file of a content group that the image forming device 2 requests from the content distributing device 1. The content group specified by the file code 502 consists of print, display, and sound contents specified by the print, display, and sound content codes 503, 504, and 505. A set of display, sound, and print contents specified by codes written in the same row of the table 501 are reproduced together. The operation mode 506 indicates how reproduced display and sound contents are changed in accordance with printing of a print content.

The content group specified by the file code 502 shown as "1" consists of page contents of print, display, and sound contents. The second row of the code table 501 includes the print content code 503 shown as "P00801", the display content code 504 shown as "V00101", and the sound content code 505 shown as "M00401". This indicates that page contents specified by these content codes are reproduced together. The page content specified by the print content code "P00801" is a print page content of the CD jacket 402 shown in FIG. 5B. The page content specified by the display content code "V00101" is the video message from the singer of the CD, for example. The page content specified by the sound content code "M00401" may be voice of the video message. When these page contents associated with one another are sent to the image forming device 2, the display unit 209 displays the video message while the sound reproducing unit 208 reproduces the voice message as soon as the controller 205 instructs printing of the CD jacket 402.

Each of the third and subsequent rows of the code table 501 indicates page contents reproduced together, as with page contents of the second row. More specifically, the third row contains a print content code "P00802", a display content code "V00102", and a sound content code "S006". In the example of FIG. 5B, the print content code "P00802" specifies a page content of the lyric sheet 403, and the display content code "V00102" specifies a video page content of the dance scene for a song included in the lyric card 403. These print and video page contents are associated with a sound page content specified by the sound content code "S006". Such content code starting with "S" specifies not a content distributed by the content distributing device 1 but a content obtained by the user on his own and placed in the storing unit 210.

The operation mode 506 shown as "2" indicates that reproduced display and sound page contents in the file specified by the file code "1" are changed for each print page content.

When the operation mode 506 is shown as "1", the code table 501 may include the following: the file code 502 shown as "1"; the print content code 503 shown as "P008" that specifies the whole print content; the display content code 504 shown as "V001" specifying the whole display content; and the sound content code 505 shown as "M004" specifying the whole sound content. Here, assume that the print content with the code "P008" consists of the page contents with the codes from "P00801" to "P00812" as shown in FIG. 5B and that the display and sound contents specified by the codes "V001" and "M004" consist of a plurality of display and sound page contents. Then, the image forming device 2 starts reproducing the display and sound contents when printing the print content with the code "P008", and continues reproduction of the display and sound contents sequentially, regardless of page breaks of the print content, until the image forming device 2 completes the printing of the print content.

The following describes a case where the operation mode 506 is shown as "3". Here, assume that the image forming device 2 prints the print content of the sightseeing leaflet 409 specified by a print content code "P006" shown in FIG. 5C. The image forming device 2 then changes reproduced display and sound contents in accordance with each of the sectional contents that make up the print content. In more detail, this print content with the code "P006" consists of the following: the sectional content with the content code "P00601" which includes the spring landscape photograph 406 and its description; the sectional content with the content code "P00602" which includes the summer landscape photograph 407 and its description; and the sectional content with the code "P00603" which includes the winter landscape photograph 408 and its description. Accordingly, the code table 501 includes the following content codes: print content codes 503 shown as "P00601", "P00602", and "P00603" in different rows; and the display and sound content codes 504 and 505 that specify display and sound sectional contents to be reproduced with the print sectional contents with the content codes "P00601", "P00602", and "P00603". That is to say, when the operation mode 506 is shown as "1", the code table 501 shows content codes that each specify a whole content. When the operation mode 506 is shown as "2", the code table 501 shows content codes that each specify a page content. The table 501 shows codes that each specify a sectional content when the operation mode 506 is shown as "3".

A display content has been described above as video, although the display content may be a still image. The operation mode has been described above as being set in the code table 501 sent from the image forming device 2 to the content distributing device 1, although this is not necessary. That is to say, the operation mode does not have to be set in the code table 506 when an appropriate operation mode is clear for the content distributing device 1 from content codes included in the code table 501.

In the present embodiment, the content distributing device 1 generates a group of display, sound, and print contents in response to a code table that associates these contents with one another and that is sent from the image forming device 2. The content distributing device 1 then distributes the content group to the image forming device 2. However, it is not necessary for the content distributing device 1 to send these contents as the stated content group. For instance, the content distributing device 1 may first send a sound content alone to the image forming device 2, which then may place the received sound content into the storing unit 210. Upon receiving another request for contents, the content distributing device 1 may distribute print and display contents associated with the earlier sent sound content. In this case, the image forming device 2 refers to the code table 501 in the storing unit 210, and reads the sound content from the storing unit 210 to reproduce the sound content in synchronization with printing of the received print content, as is described when the image forming device 2 reproduces a user content.

Figure 12A:
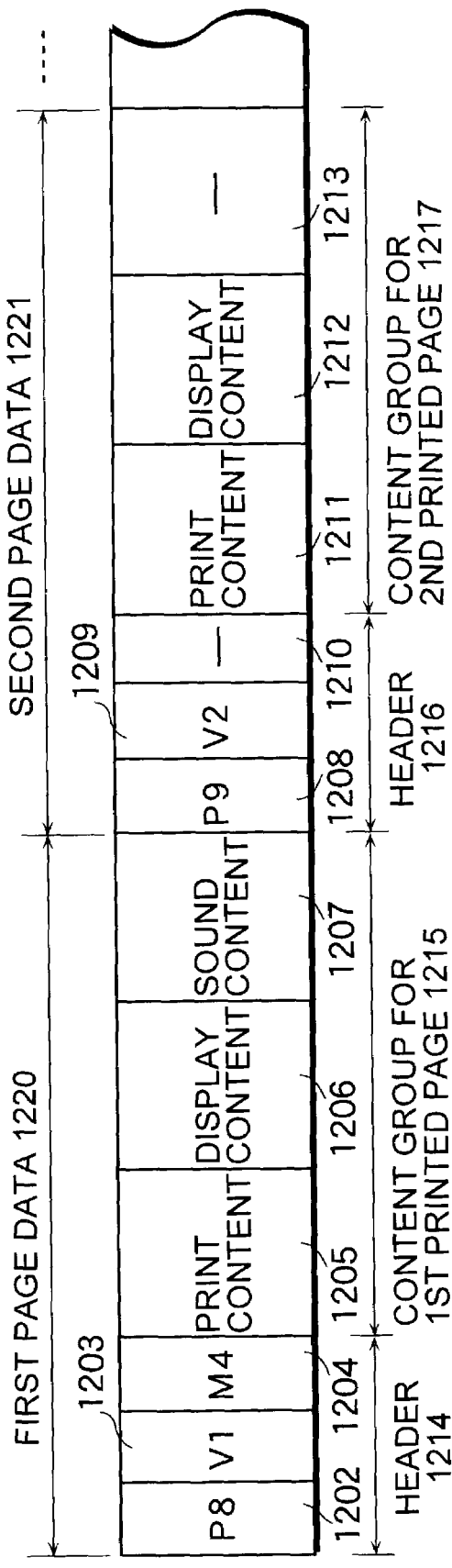
FIG. 12A shows the data structure of a content group distributed from the content distributing device in accordance with an example code table shown in FIG. 12B.
Figure 12B:
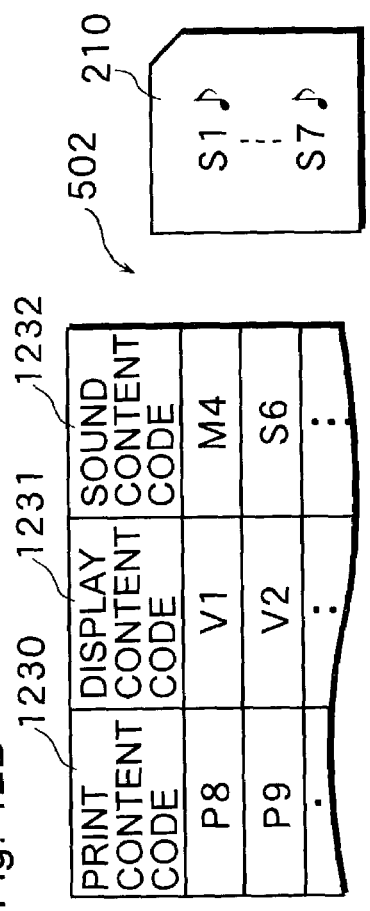
FIG. 12B shows the example code table sent as a request for a content group from the image forming device.

FIGS. 12A and 12B show a correspondence between content group data 1201 distributed by the content distributing device 1 and a code table 502 stored in the image forming device 2. FIG. 12A shows the structure of the content group data 1201 distributed by the content distributing device 1 in accordance with the code table 502 shown in FIG. 12B. FIG. 12B shows the code table 502 as an example of a code table sent from the image forming device 2 to the content distributing device 1. Here, assume that the content group data 1201 is generated based on the operation mode "2" although the operation mode is omitted from the code table 502 shown in FIG. 12B. Also, a file code field is omitted from this code table 502.

With the operation mode set as "2", the content group data 1201 includes the following: a group of page contents consisting of a print page content and other page contents associated with the print page content; and headers that show information on the group of page contents. In more detail, the content group data 1201 includes first page data 1220 and second page data 1221. The first page data 1220 contains a header 1214 and a content group 1215 consisting of a print page content 1205, a display page content 1206, and a sound page content 1207. The header 1214 includes the following content codes: a code 1202 shown as "P8" that specifies a file of the print page content 1205; a code 1203 shown as "V1" that specifies a file of the display page content 1206; and a code 1204 shown as "M4" that specifies a file of the sound page content 1207. Similarly, the second page data 1221 contains a header 1216 and a content group 1217 reproduced for the second printed page. The content group 1217 only includes a print page content 1211 and a display page content 1212 with a field 1213 of a sound page content left blank. The header 1216 contains a content code 1208 shown as "P9" specifying a file of the print page content 1211, and a content code 1209 shown as "V2" specifying a file of the display page content 1212, with a field 1210 for a content code of a sound page content left blank.

The second row of the code table 502 includes a print content code 1230 shown as "P8", a display content code 1231 shown as "V1", and a sound content code 1232 shown as "M4". The print content specified by the content code "P8" is a print page content of the first printed page, and the display and sound contents specified by the content codes "V1" and "M4" are page contents reproduced with the print page content. The third row of the code table 502 includes content codes "P9", "V2", and "S6". The display and sound page contents specified by the content codes "V2" and "S6" are reproduced with the print page content specified by the code "P9".

When receiving a code table, such as the code table 502, which indicates a sound page content with a content code that starts with "S", such as "S1" to "S7", the content distributing device 1 recognizes that this sound page content is stored in the storing unit 210 of the image forming device 2. The content distributing device 1 then sends data, such as the second page data 1221 containing the blank fields 1210 and 1213. The image forming device 2 receives such content group data, and has the controller 205 read headers in the content group data to check whether or not the field 1210 specifying a sound page content is blank when reproducing the content group. If so, the controller 205 searches the code table, such as the code table 502, in the storing unit 210 to find a pair of the content codes of, for example, "P9" and "V2". As a result, the controller 205 finds the content code "S6", reads a sound page content specified by the found content code "S6" from the storing unit 210, and reproduces the read sound page content while displaying the display page content with the code "V2" in synchronization with printing of the print page content with the code "P9". In this way, the image forming device 2 is capable of reproducing a sound content recorded by the user on his own in synchronization with a print content.

It is not necessary that a content code specifying a sound content obtained by the user on his own starts with "S", and any code can be used as the content code. Not only a sound content but also a display content may be a content obtained by the user on his own, such as a photograph taken by a digital camera and digital video. In this case, a code table for such display content may be produced in the same way as when a code table for a sound content is produced, so that this display content can be reproduced in synchronization with other contents.

With reference to FIG. 12A, the data structure of the content group data 1201 with the operation mode is "2" has been described. When the operation mode is "1", the content group data includes the following: a group of contents consisting of a print content and sound and display contents that are reproduced with the whole print content; and a header showing content codes of the group of contents. When the operation mode is "3", the content group data includes the following: a group of contents consisting of a print sectional content and sound and display contents that are reproduced with the print sectional content; and a header of the group of contents. For instance, content group data for the sightseeing leaflet 409 shown in FIG. 5C includes three sets of data for three sectional contents. The first set of data includes the following: the print sectional content with the content code "P00601" which includes the spring landscape photograph 406 and its description; sound and display sectional contents reproduced with the print sectional content; and a header that shows content codes of a group of these sectional contents. The second set of data includes the following: the print sectional content with the content code "P00602" which includes the summer landscape photograph 407 and its description; sound and display sectional contents reproduced with the print sectional content; and a header that shows content codes of a group of these sectional contents. The third set of data includes the following: the print sectional content with the content code "P00603" which includes the winter landscape photograph 408 and its description; sound and display sectional contents reproduced with the print sectional content; and a header that shows content codes of a group of these sectional contents. In this way, the content distributing device 1 distributes a group of contents produced in accordance with the operation mode set by the user of the image forming device 2. This allows the image forming device 2 to reproduce display and sound contents in synchronization with a print content without referring to the set operation mode.

In the above first embodiment, the image forming device 2 places a received content group into the storing unit 210 before reproducing the received content group, although this is not necessary. It is alternatively possible for the image forming device 2 to either access the content distributing device 1 within a certain timing or reproduce the received content group in real time.

The above embodiment states that the user associates print, display, and sound contents with one another, although who performs this association is not related to the gist of the present invention. That is to say, the user may simply receive a group of contents, which are associated beforehand with one another, from the content distributing device 1.

The first embodiment states that display and sound contents are associated with a print content in accordance with the set operation mode, although this association does not need to be based on the set operation mode. That is to say, without the operation mode being set, a print content may be associated with a plurality of display and sound contents as necessary.

The first embodiment describes an operation to transfer a content group between the content distributing device 1 and the image forming device 2 connected to each other via the WAN 4, although the present invention is not restricted to such an embodiment. For example, the content distributing device 1 may send a content group to the image forming device 2 via a LAN when these devices 1 and 2 are installed in the same building. It is also possible for the content distributing device 1 to send a content group to the image forming device 2 for a great distance via the Internet or the like. Alternatively, a content group may be stored in a transportable recording medium such as an optical disc and semiconductor memory to be distributed to the image forming device 2. In this case, the distributed group content may be first sent to a PC and then to the storing unit 210 such as an IC card.

The above embodiment states that display and sound contents are reproduced in synchronization with printing of a print content. It is also possible to provide a sound content that informs the user of the end of printing of a print content and to associate this sound content with the print content, with the storing unit 210 or the like storing this sound content, so that this sound content is reproduced as soon as printing of the print content is completed. It is also possible to reproduce a certain sound content so as to inform the user of the reception of a content group including a predetermined content by associating the certain sound content with the predetermined content. A plurality of sound contents may be provided in advance as the above sound contents for informing the user of the end of printing and reception of the certain print content so that the user can select desired sound contents from the plurality of sound contents.

Figure 13:
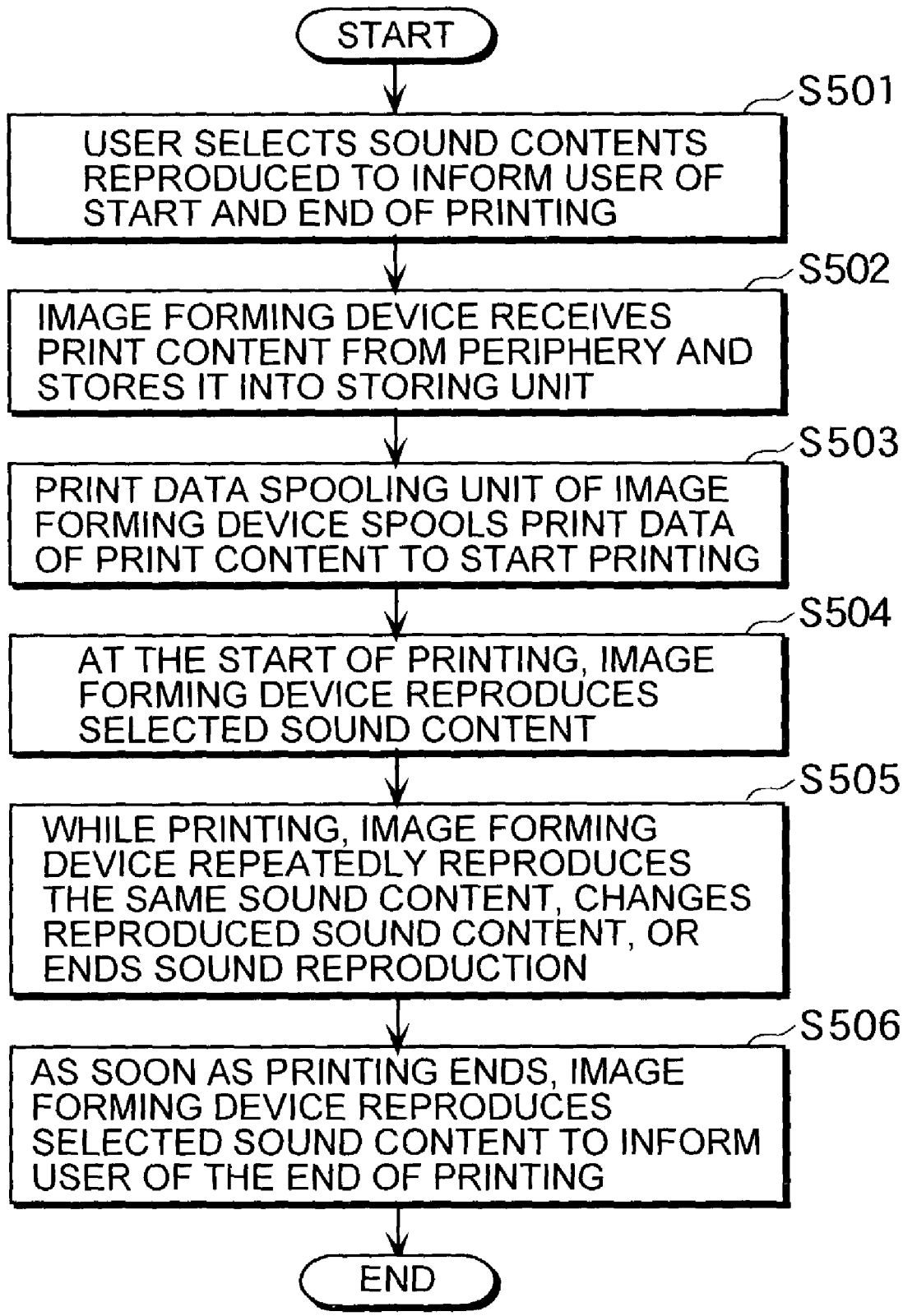
FIG. 13 is a flowchart showing an operation of the image forming device that reproduces a predetermined stored sound content whenever one printing operation ends.

FIG. 13 is a flowchart showing an operation of the image forming device 2 to reproduce sound contents stored in the storing unit 210 at the start and end of printing. Before this operation, the user registers sound contents that are reproducible by the sound reproducing unit 208 on the storing unit 210. The user selects sound contents to be reproduced at the start and end of printing from the sound contents in the storing unit 210 (step S501). The image forming device 2 then stores information on timing with which the selected sound contents are reproduced into the storing unit 210. The image forming device 2 then receives a print content from the content distributing device 1, and stores the received print content into the storing unit 210 (step S502). The print data spooling unit 204 receives print data of the received print content, spools the print data, and sends the print data to the printer engine 206 in order, so that printing starts (step S503). When the printing starts, the controller 205 has the sound reproducing unit 208 reproduce the sound content selected by the user (step S504). While printing, the controller 205 instructs the sound reproducing unit 280 to repeatedly reproduce the same sound content associated with the present print content, switch to reproduction of another sound content, and/or terminate reproduction of a sound content as necessary (step S505). As soon as the print is completed, the sound reproducing unit 208 stops reproduction of the present sound content, and reproduces the sound content, which is selected by the user and stored in the storing unit 210, so as to inform the user of the end of the printing (step S506). The image forming device 2 then enters the standby state. When a reproduction time of the sound content is longer than the printing time, it is desirable to stop reproduction of the sound content through a fade-out. When the printing time is longer than the reproduction time of the sound content, the same sound content may be repeatedly reproduced, or different sound contents may be reproduced during the printing to adjust the sound reproduction time.

Second Embodiment

Figure 14:
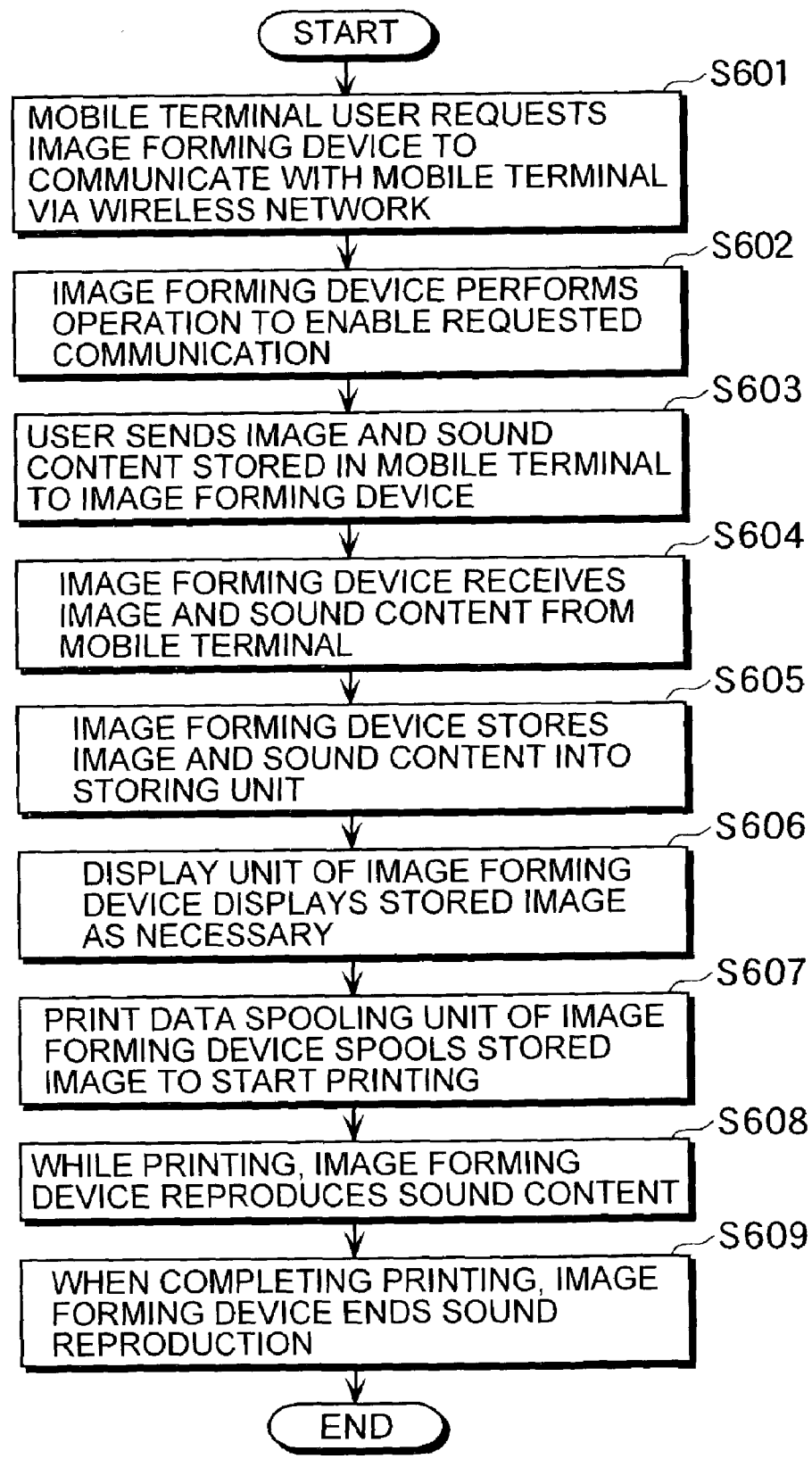
FIG. 14 is a flowchart showing an operation performed by a mobile terminal which produces a content group and by the image forming device which receives the content group and reproduces a sound content in the content group in synchronization with printing of an image in the group.

The following describes a content distributing system according to the second embodiment of the present invention in which the mobile terminal 3 sends a group of contents to the image forming device 2, which then reproduces the sound content while displaying or printing contents in the same content group. The mobile terminal 3 produces the content group containing a sound content and images that are associated with one another. FIG. 14 is a flowchart showing this operation performed by the mobile terminal 3 and the image forming device 2 receiving the content group and reproducing the sound content in synchronization with the images.

The user of the mobile terminal 3 makes a connection request to the image forming device 2 to communicate via the wireless network 6 (step S601). Responding to the connection request, the image forming device 2 performs an operation to enable the communication with the mobile terminal 3 via the wireless network 6 (step S602). In response to an instruction from the user of the mobile terminal 3, the content group generating unit 307 produces, from the stored contents and images, a group of contents associated with one another, and the content sending unit 308 sends the produced group of contents to the image forming device 2 (step S603). The image forming device 2 receives the content group (step S604), and stores the received content group into the storing unit 210 (step S605). The user of the image forming device 2 has the display unit 209 display an image included in the received content group to view the received image (step S606). When the user wishes to print this image, the controller 205 transfers the image from the storing unit 210 to the print data spooling unit 204, which then spools and sends the print data to the printer engine 606 so that printing starts (step S607). When the printer engine 206 starts printing, the controller 205 transfers the sound content from the storing unit 210 to the sound reproducing unit 208, which then starts reproducing the sound content (step S608). As soon as the printer engine 206 completes the printing, the controller 205 has the sound reproducing unit 208 stop reproduction (step S609). When the reproduction time of the sound content is longer than the printing time, it is desirable to stop sound reproduction through a fade-out. When the printing time is longer than the sound reproduction time, the same sound content may be repeatedly reproduced, or different sound contents may be reproduced during the same printing so as to adjust the sound reproduction time.

Figure 15:
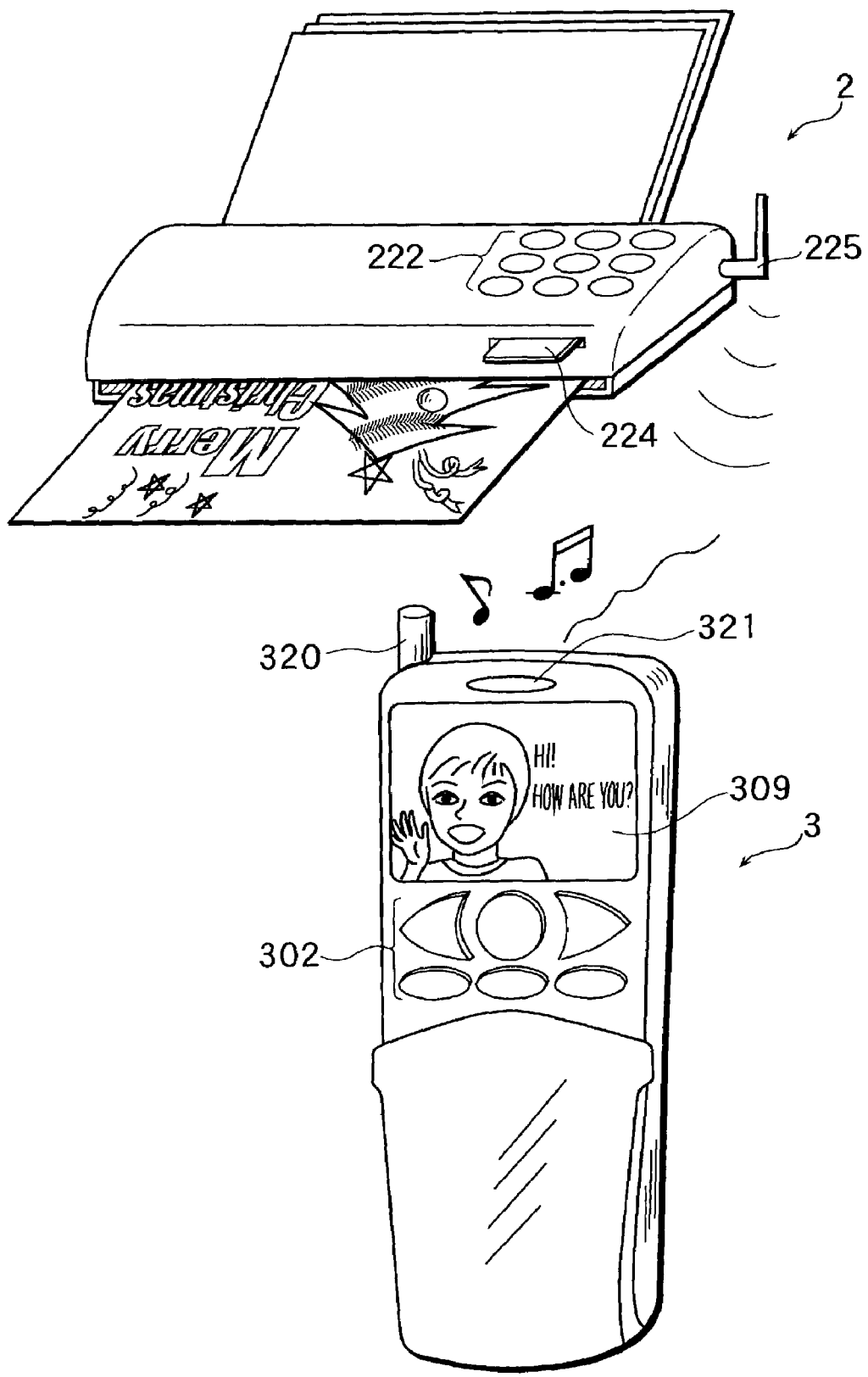
FIG. 15 shows an external view of the mobile terminal and the image forming device that uses a display unit and a sound reproducing unit of the mobile terminal.

The image forming device 2 shown in FIG. 2 includes the display unit 209 and the sound reproducing unit 208, although the image forming device 2 may use the display unit 309 and the sound reproducing unit 321 of the mobile terminal 3 as shown in FIG. 15. FIG. 15 shows an external view of such an image forming device 2 and the mobile terminal 3. The image forming device 2 includes the input operational unit 222, the IC card 224, and an antenna 225. The mobile terminal 3 includes the input operational unit 302, the display unit 309, an antenna 320, and the speaker 321. The mobile terminal 3 produces a content group and communicates with the image forming device 2 via the antenna 320 and the wireless network to send the produced content group. Upon receiving the content group, the image forming device 2 extracts an image from the content group to print the extracted image. When the user of the image forming device 2 wishes to see the image by using the display unit 309 of the mobile terminal 3, the image forming device 2 sends the image as a display content together with an instruction to display the image to the mobile terminal 3, so that the mobile terminal 3 displays the sent image. (When the mobile terminal 3 has already stored the image, the display instruction alone is sent to the mobile terminal 3.) When the user wishes to have the mobile terminal 3 reproduce the sound content included in the received content group while the image forming device 2 performs printing, the image forming device 2 sends the sound content and an instruction to reproduce the sound content to the mobile terminal 3. (When the mobile terminal 3 has already stored the sound content, the reproduction instruction alone is sent to the mobile terminal 3.) This system achieves sound reproduction in synchronization with printing even when the image forming device 2 does not include the display unit and the sound reproducing unit.

In the above embodiment, a sound content stored in the mobile terminal 3 may be a ringing melody that is associated by the user of the mobile terminal 3 with a certain caller. This is described below with reference to FIGS. 16–18.

Figure 16:
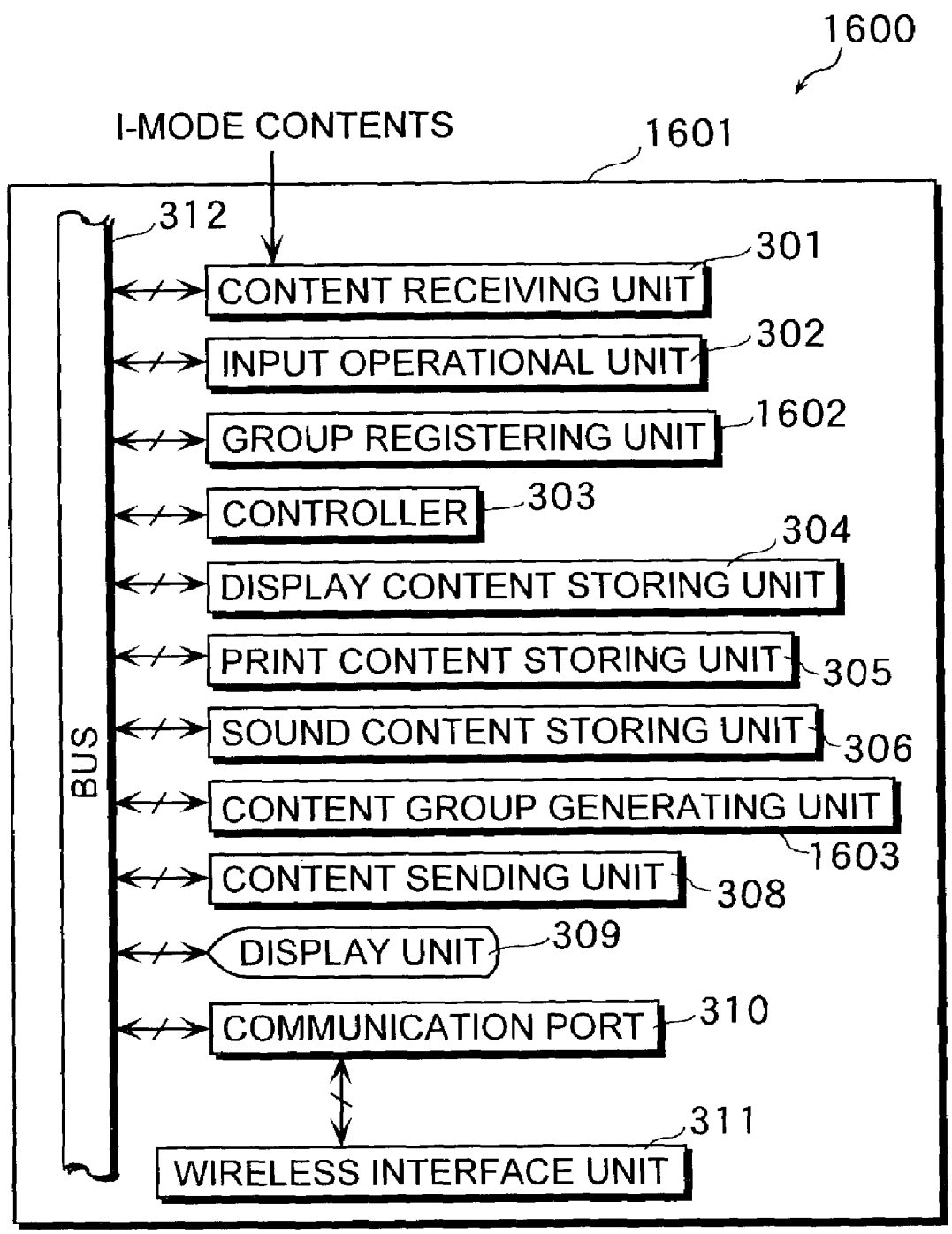
FIG. 16 is a block diagram showing the construction of a mobile terminal included in a content distributing system for reproducing a ringing melody of the mobile terminal as a sound content in synchronization with printing of a print content.

FIG. 16 is a block diagram showing the construction of such a mobile terminal 1601 in a content distributing system 1600, which also includes the image forming device 2 that reproduces a ringing melody stored in this mobile terminal 1600 in synchronization with printing of a printing content. This content distributing system 1600 differs from the distributing system 100 shown in FIG. 2 in that the mobile terminal 1601 in the content distributing system 1600 includes a group registering unit 1602 and a content group generating unit 1603, but other parts are basically the same in the two distributing systems 100 and 1600. Accordingly, the content distributing device 1, the image distributing device 2, the WAN 4, the router 5, and the wireless network 5 are not shown in FIG. 16. Elements common to the present mobile terminal 1601 and the mobile terminal 100 are assigned the same reference numbers in FIGS. 2 and 16, and will not be described below.

The group registering unit 1602 is provided to a conventional mobile terminal, and generates information used for reproducing the same ringing melody for incoming calls from callers that are registered under the same group. In more detail, in accordance with user inputs via the input operational unit 302, the group registering unit 1602 classifies callers specified by the user into groups, and generates a group table that associates each group with a different ringing melody.

In accordance with the generated group table, the content group generating unit 1603 associates a sound content that is a ringing melody with a print content (an image) received from outside the mobile terminal 1601 to produce a content group including the sound and print contents. The content sending unit 308 sends the produced content group to the image forming device 2.

FIGS. 17A and 17B show example tables that are generated as a result of a registration operation performed by the group registering unit 1602. FIG. 17A shows an example group table 700 generated by the group registering unit 1602, and FIG. 17B shows an example address table 710 that associates a caller ID 702 with a caller address 704. The group table 700 includes a group ID 701, a caller ID 702, and a ringing sound ID 703. The group ID 701 specifies a group of callers, and the caller ID 702 specifies a caller in each group. The ringing sound ID 703 is a content ID that specifies, as a ringing sound, one of sound contents stored in the sound content storing unit 306. For instance, the group table 700 associates the group ID 701 shown as "A" with the caller IDs 702 shown as "0002", "0003", and "0011" and with the ringing sound ID 703 show as "007". As a result, when the mobile terminal 1601 receives a call from one of the three callers specified by the caller IDs "0002", "0003", and "0011" under the group "A", the sound content that is specified by the ringing sound ID "007" and that is stored in the sound content storing unit 306 is reproduced.

The group table 700 also associates a group ID "B" with caller IDs "0001" and a ringing sound ID "035". As a result, when the mobile terminal 1601 receives a call from the caller specified by the caller ID "0001", a sound content with the ringing sound ID "035" is found in the sound content storing unit 306 and reproduced. Similarly, for a group specified by the group ID "C", a sound content with a ringing sound ID "021" is reproduced when the mobile terminal 1601 receives a call from a caller specified by a caller ID "0123".

The address table 710 shown in FIG. 17B associates a caller ID 702 with a caller address 704. For instance, the caller address 704 shown as "fullbank@rideon.or.jp" is associated with the caller ID 702 shown as "0001" that specifies a caller who has this caller address. The caller address 704 shown as "highpeak@pine.ne.jp" is associated with the caller ID 702 shown as "0002" that specifies a caller who has this caller address. Similarly, the caller address "highside@road.gr.jp" is associated with the caller ID "0003" that specifies a caller with this caller address.

When the mobile terminal 1601 receives a print content, the content group generating unit 1603 refers to a caller address of a caller who sent the print content, and finds, from the address table 710, the caller ID 702 associated with the caller address. After this, the content group generating unit 1603 searches the group table 700 to find the ringing sound ID 703 associated with the found caller ID 702. The content group generating unit 1603 then associates a sound content specified by the found ringing sound ID 703 with the received print content to produce a group of the contents.

Figure 18:
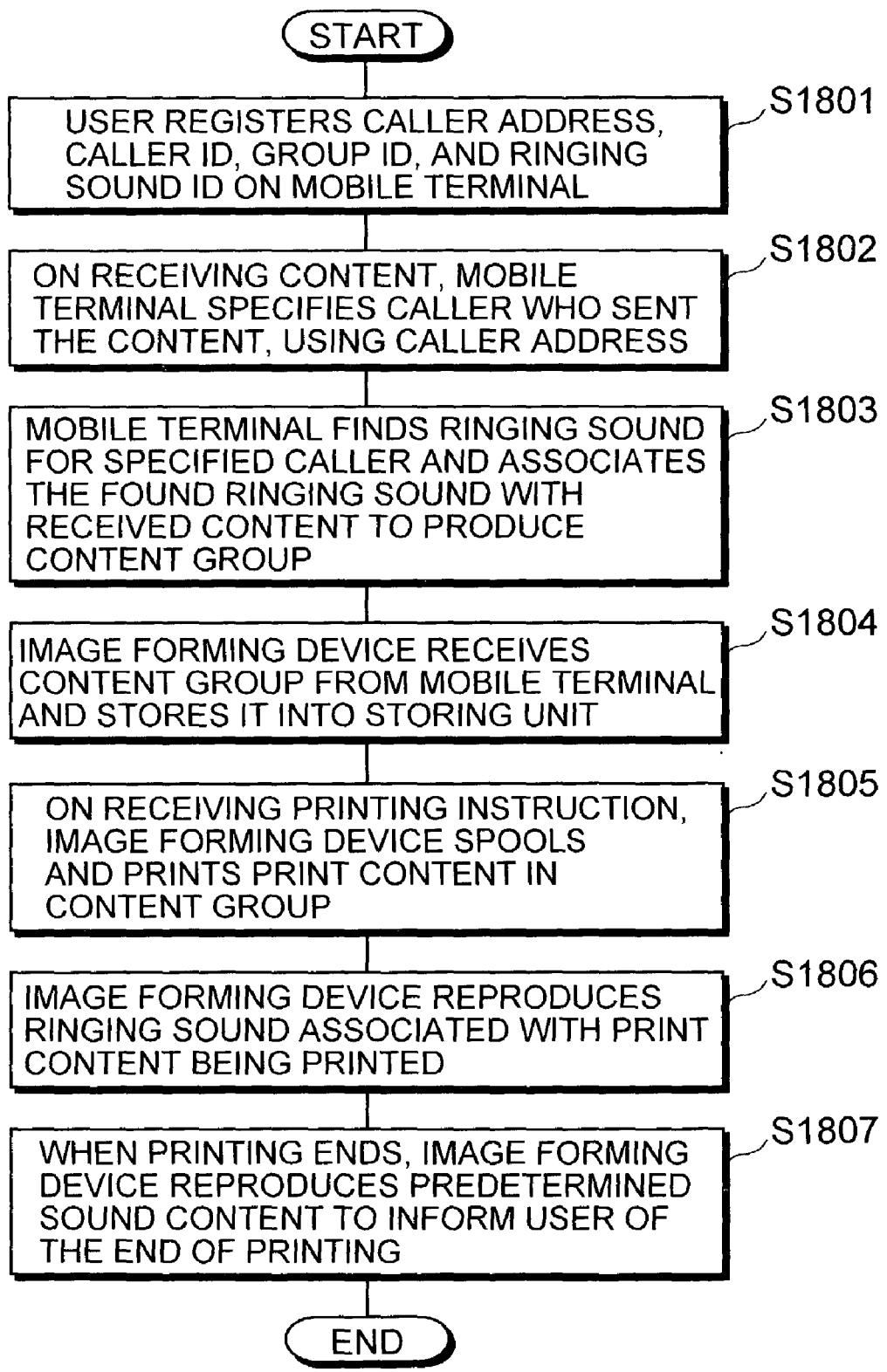
FIG. 18 is a flowchart showing an operation of the mobile terminal and the image forming device to reproduce a registered ringing melody (i.e., a sound content) in synchronization with printing of an image (i.e., a print content).

FIG. 18 is a flowchart showing an operation performed by the mobile terminal 1601 and the image forming device 2 that reproduces a ringing melody (i.e., a sound content), which has been selected in accordance with a group to which a caller belongs, in synchronization with printing of an image (i.e., a print content). The user of the mobile terminal 1601 operates the input operational unit 302 to classify callers into groups and associate a different ringing melody with each of the groups. At the same time, the mobile terminal 1601 issues a caller ID to each caller address that is entered via the input operational unit 302. Based on data thus entered via the input operational unit 302, the group registering unit 1602 generates the address table 710 and the group table 700, and stores them (step S1801).

When receiving an image, the mobile terminal 1601 refers to the address table 710 to specify a caller ID associated with a caller address of a caller who sent the image (step S1802), and searches the group table 700 to find a ringing sound ID associated with the specified caller ID. Upon finding the ringing sound ID, the mobile terminal 1601 associates a ringing melody specified by the found ringing sound ID with the received image to produce a content group (step S1803). When the mobile terminal 1601 does not find the caller ID of the caller who sent the image in the address table 710, the mobile terminal 1601 associates the received image with a predetermined ringing melody set beforehand for unspecified callers, and produces a content group. The mobile terminal 1601 sends this content group to the image forming device 2, which then stores the content group in the storing unit 210 (step S1804).

Upon receiving an instruction to print the image in the content group, the image forming device 2 expands the print content for the image into print data, sends the print data to the print data spooling unit 204 to print the image (step S1805). While printing the image, the image forming device 2 has the sound reproducing unit 208 reproduce the ringing melody associated with the printed image (step S1806). In accordance with a time taken to print the image, the sound reproducing unit 208 may repeatedly reproduce the same ringing melody or fade out the melody. As soon as the printing ends, the sound reproducing unit 208 reproduces a predetermined sound content to inform the user of the end of the printing (step S1807).

While printing or displaying a content, the above image forming device 2 is capable of reproducing a ringing melody associated with a caller or a producer who sent the content. As a result, the user of the image forming device 2 can know who sent the content by listening to the ringing melody.

What is claimed is:

1. An image forming device having a sound reproducing capability, said image forming device comprising:
   a printing unit operable to print a print content;
   a sound reproducing unit operable to reproduce a sound content in synchronization with printing of the print content,
   wherein when a reproduction duration of the sound content is longer than a printing duration of the print content, said printing unit is operable to adjust a duration between an end of printing the print content and a start of printing a next print content in accordance with the reproduction duration.

2. An image forming device having a sound reproducing capability, said image forming device comprising:
   a printing unit operable to print a print content;
   a sound reproducing unit operable to reproduce a sound content in synchronization with printing of the print content,
   wherein when a printing duration of the print content is longer than a reproduction duration of the sound content, said sound reproducing unit is operable to reproduce the sound content at a reproduction speed which is adjusted in accordance with a printing speed of said printing unit.

3. An image forming system comprising:
   an image forming device; and
   a mobile terminal having a sound reproducing capability,
   wherein said image forming device includes:
      a printing unit operable to print a print content; and
      a sending unit operable to send a sound content and a reproduction instruction to reproduce the sound content to said mobile terminal;
   wherein said mobile terminal includes:
      a receiving unit operable to receive the sound content and the reproduction instruction from said sending unit;
      a sound reproducing unit operable to reproduce the received sound content in accordance with the received reproduction instruction; and
   wherein in synchronization with printing of the print content, said sending unit is operable to send the reproduction instruction and the sound content associated with the print content; and
   wherein when a reproduction duration of the sound content is longer than a printing duration of the print content, said printing unit is operable to adjust a duration between an end of printing the print content and a start of printing a next print content in accordance with the reproduction duration.

4. An image forming system comprising:
   an image forming device; and
   a mobile terminal having a sound reproducing capability,
   wherein said image forming device includes:
      a printing unit operable to print a print content; and
      a sending unit operable to send a sound content and a reproduction instruction to reproduce the sound content to said mobile terminal;

wherein said mobile terminal includes:
- a receiving unit operable to receive the sound content and the reproduction instruction from said sending unit; and
- a sound reproducing unit operable to reproduce the received sound content in accordance with the received reproduction instruction;
- wherein in synchronization with printing of the print content, said sending unit is operable to send the reproduction instruction and the sound content associated with the print content; and wherein when a printing duration of the print content is longer than a reproduction duration of the sound content, said sending unit is operable to send the sound content and the reproduction instruction to reproduce the sound content at a reproduction speed which is adjusted in accordance with a printing speed of said printing unit.

5. A content reproducing method for receiving a content from a content distribution server and reproducing the content, said method comprising:

receiving, from the content distribution server, a content group that contains a print content and a plurality of sound contents, the print content and the plurality of sound contents being associated with a page making up the print content;

printing the print content in the received content group; and reproducing each sound content in the received content group at a speed which is adjusted in accordance with a processing speed in said printing of the print content.

6. A content reproducing method for receiving a content from a content distribution server and reproducing the content, said method comprising:

receiving, from the content distribution server, a content group that contains a print content and a plurality of sound contents, wherein the print content is divided into different constituent units, each of the constituent units being associated with a plurality of sound contents;

printing the print content in the received content group; and reproducing each sound content in the received content group at a speed which is adjusted in accordance with a processing speed in said printing of the print content.

* * * * *